United States Patent
Pasternak et al.

(10) Patent No.: US 10,817,625 B2
(45) Date of Patent: Oct. 27, 2020

(54) METHOD, DEVICE, AND SYSTEM FOR TRIGGERING AND PROPAGATING OF A COVERT MODE STATUS CHANGE USING CONFIGURATION PROTOCOL DATA

(71) Applicant: MOTOROLA SOLUTIONS, INC., Chicago, IL (US)

(72) Inventors: Tal Pasternak, Mazkeret Batya (IL); David J. Ley, Plantation, FL (US); Kiesha Grant, Sunrise, FL (US); Alexander Massover, BatHefer (IL); Pavel Livshits, Modiyin (IL); Lisajane M. Romer, Delray Beach, FL (US)

(73) Assignee: MOTOROLA SOUTIONS, INC., Chicago, IL (US)

( * ) Notice: Subject to any disclaimer, the term of this patent is extended or adjusted under 35 U.S.C. 154(b) by 115 days.

(21) Appl. No.: 16/198,104

(22) Filed: Nov. 21, 2018

(65) Prior Publication Data

US 2020/0159968 A1 May 21, 2020

(51) Int. Cl.
*G06F 21/84* (2013.01)
*H04W 52/14* (2009.01)
(Continued)

(52) U.S. Cl.
CPC .............. *G06F 21/84* (2013.01); *G06F 21/74* (2013.01); *H04L 63/205* (2013.01); *H04W 52/146* (2013.01)

(58) Field of Classification Search
CPC ....... G06F 21/84; G06F 21/74; H04L 63/205; H04W 52/146
See application file for complete search history.

(56) References Cited

U.S. PATENT DOCUMENTS

| 2008/0089348 A1* | 4/2008 | Appanna | H04L 45/54 370/401 |
| 2009/0310290 A1* | 12/2009 | Tennent | G09G 3/20 361/679.03 |

(Continued)

FOREIGN PATENT DOCUMENTS

WO    WO-2017160171 A1    9/2017

*Primary Examiner* — Joseph P Hirl
*Assistant Examiner* — Stephen T Gundry
(74) *Attorney, Agent, or Firm* — Perry + Currier, Inc.

(57) ABSTRACT

A process for triggering and propagating a covert mode status change using configuration protocol data includes, while a computing device is in a non-covert mode, maintaining one or more externally-perceivable output devices according to non-covert-configuration data of a non-covert profile; in response to detecting a trigger: changing the computing device to a covert mode; selecting a covert profile; controlling the externally-perceivable output devices according to covert-configuration data of the covert profile; and transmitting an instruction message to each of one or more second computing devices, the instruction message comprising: a status change message to place each of the one or more second computing devices in a respective covert mode; and covert-configuration protocol data mapped to the covert-configuration data of the covert profile, such that respective externally-perceivable output devices, at the one or more second computing devices, are controlled according to the covert-configuration protocol data.

20 Claims, 13 Drawing Sheets

(51) Int. Cl.
   *H04L 29/06*    (2006.01)
   *G06F 21/74*    (2013.01)

(56) References Cited

U.S. PATENT DOCUMENTS

| | | | |
|---|---|---|---|
| 2012/0204307 A1* | 8/2012 | De Mattei | H04N 21/41415 |
| | | | 2/69 |
| 2014/0098206 A1* | 4/2014 | Rosella | H04N 5/64 |
| | | | 348/61 |
| 2015/0228196 A1* | 8/2015 | Sampigethaya | B64D 43/00 |
| | | | 701/120 |
| 2016/0036953 A1* | 2/2016 | Lee | H04M 1/7253 |
| | | | 455/426.1 |
| 2018/0137263 A1* | 5/2018 | Kurian | B60N 2/002 |
| 2019/0219870 A1* | 7/2019 | Nugraha | G06F 21/84 |
| 2020/0105113 A1* | 4/2020 | Williams | G06Q 50/265 |
| 2020/0107155 A1* | 4/2020 | Williams | G06F 21/36 |
| 2020/0135182 A1* | 4/2020 | Kahlon | G06F 16/3329 |

* cited by examiner

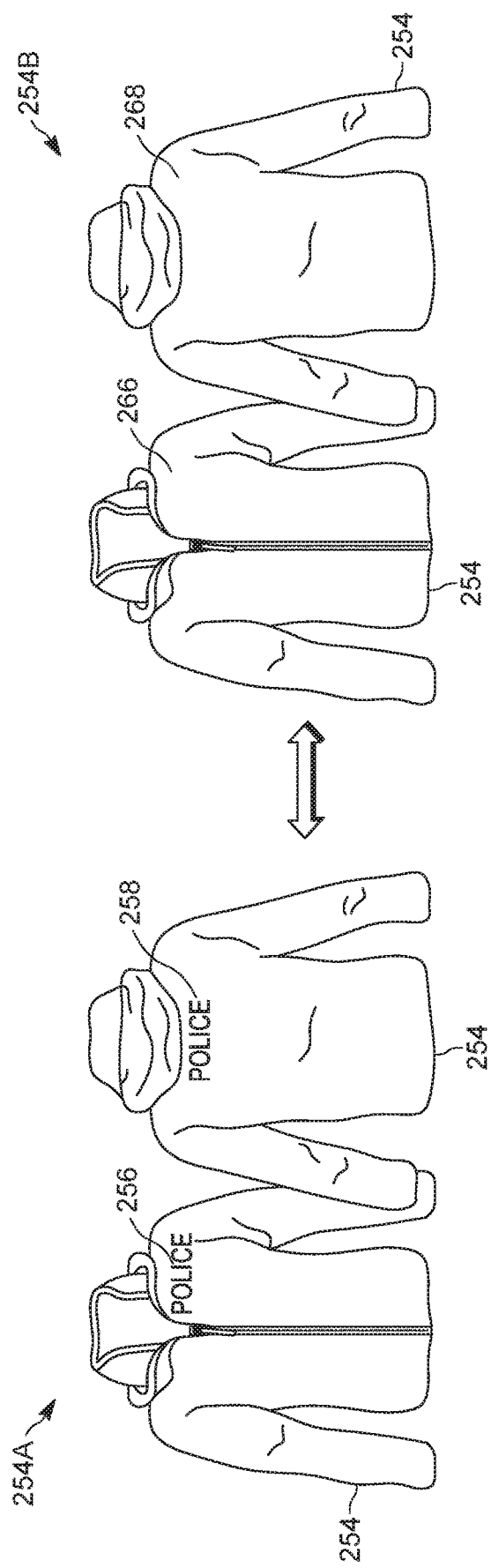

| CONFIGURATION PROTOCOL DATA 1001 | CONFIGURATION DATA 1002-1 | CONFIGURATION DATA 1002-2 | CONFIGURATION DATA 1002-3 |
|---|---|---|---|
| LIGHTS OFF | DIM DISPLAY SCREEN 605-1 TO 30%<br><br>TURN OFF LIGHT 609 AND FLASH MODE | DIM DISPLAY SCREEN 605-1 TO 25% | |
| SOUND REROUTE | REDUCE AUDIO OF SPEAKER 607-1 TO 25% | ROUTE AUDIO FROM SPEAKER 607-2 TO HEADSET 913 | ROUTE AUDIO FROM SPEAKER 607-2 AND RSM 611 TO EARPIECE 615 |
| RADIO OFF | REDUCE RADIO EMISSIONS TO 25% | REDUCE RADIO EMISSIONS TO 30% | REDUCE RADIO EMISSIONS TO 20% |
| NOTIFICATIONS OFF | VISUAL NOTIFICATIONS AT DISPLAY SCREEN 605-1 ONLY | AUDIO NOTIFICATIONS AT HEADSET 913 ONLY | ROUTE NOTIFICATIONS TO HAPTIC DEVICE 617 |

FIG. 10

METHOD, DEVICE, AND SYSTEM FOR TRIGGERING AND PROPAGATING OF A COVERT MODE STATUS CHANGE USING CONFIGURATION PROTOCOL DATA

BACKGROUND OF THE INVENTION

Many public safety operations rely upon the element of stealth or surprise while others rely upon visibility to provide an identification or deterrent effect. Accordingly, public safety teams may operate in a "covert mode" in which they attempt to conceal their membership in a public safety organization by, e.g., hiding or covering one or more externally-perceivable indications of law enforcement activity. For example, police officers may dress themselves in 'plainclothes' outfits or drive un-marked vehicles. However, if one computing device in the public safety team is in covert mode different from the others, a mission critical situation may be placed in jeopardy, which may lead to one or more members of public safety team being detected.

In other situations, public safety teams may operate in a "non-covert mode" for ease in identifying friendly forces or for increased deterrent effects. For example, police officers may dress in formal police attire that is adorned with text, badges, or other markings identifying the wearer as a police officer. Similarly, vehicles may be adorned with lights, colors, text, signage, speakers, etc. that clearly identify the vehicle as a police vehicle.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 2B is a system diagram illustrating externally-perceivable outputs of the police officer of FIG. 1B in accordance with some examples.

FIG. 10 depicts configuration protocol data mapped to configuration data, in accordance with some examples.

Figure 1A:
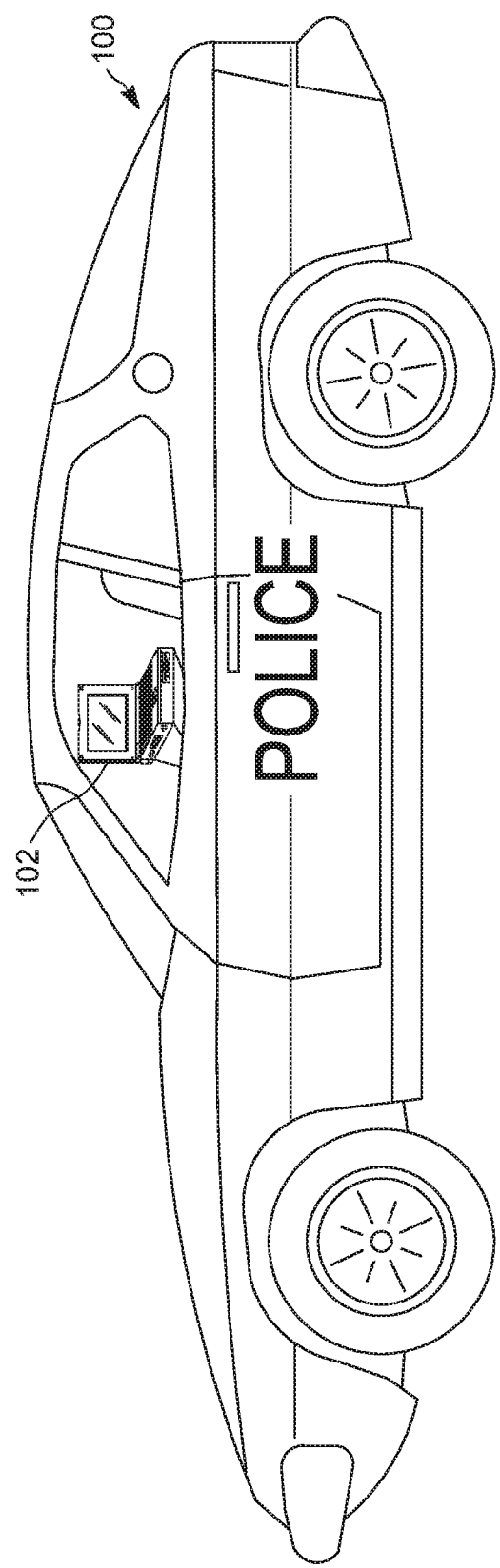
FIG. 1A is a system diagram illustrating a police vehicle having a computing device communicatively coupled to externally-perceivable outputs in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An aspect of the specification provides a computing device comprising: a communications unit configured to communicate with one or more second computing devices; one or more externally-perceivable output devices; a memory storing one or more profiles, each of the one or more profiles classified as covert or non-covert, each of the one or more profiles comprising a mapping between configuration data, defining respective behavior of the one or more externally-perceivable output devices, and configuration protocol data for controlling respective one or more externally-perceivable output devices at the one or more second computing devices; and a controller communicatively coupled to the communications unit, the one or more externally-perceivable output devices, and the memory, the controller configured to: in a non-covert mode, maintain the one or more externally-perceivable output devices according to non-covert-configuration data of a non-covert profile, of the one or more profiles; in response to detecting a trigger: change to a covert mode; select a covert profile from the one or more profiles; control the one or more externally-perceivable output devices according to covert-configuration data of the covert profile; and transmit, using the communications unit, an instruction message to each of the one or more second computing devices, the instruction message comprising: a status change message to place each of the one or more second computing devices in a respective covert mode; and covert-configuration protocol data mapped to the covert-configuration data of the covert profile, such that the respective one or more externally-perceivable output devices, at the one or more second computing devices, are controlled according to the covert-configuration protocol data.

Another aspect of the specification provides a method comprising: while a computing device is in a non-covert mode, maintaining, at the computing device, one or more externally-perceivable output devices according to non-covert-configuration data of a non-covert profile, of one or more profiles, the computing device having access to a memory storing the one or more profiles, each of the one or more profiles classified as covert or non-covert, each of the one or more profiles comprising a mapping between configuration data, defining respective behavior of the one or more externally-perceivable output devices, and configuration protocol data for controlling respective one or more externally-perceivable output devices at one or more second computing devices; in response to detecting, at the computing device, a trigger: changing the computing device to a covert mode; selecting, at the computing device, a covert profile from the one or more profiles; controlling, at the computing device, the one or more externally-perceivable output devices according to covert-configuration data of the covert profile; and transmitting, at the computing device, an instruction message to each of one or more second computing devices, the instruction message comprising: a status change message to place each of the one or more second computing devices in a respective covert mode; and covert-configuration protocol data mapped to the covert-configuration data of the covert profile, such that the respective one or more externally-perceivable output devices, at the one or more second computing devices, are controlled according to the covert-configuration protocol data.

Prior to discussing methods, devices, and systems for triggering and propagating of a covert mode status change using configuration protocol data, methods, devices, and systems for triggering and propagating of a covert mode status change without using configuration protocol data are described.

Figure 1B:
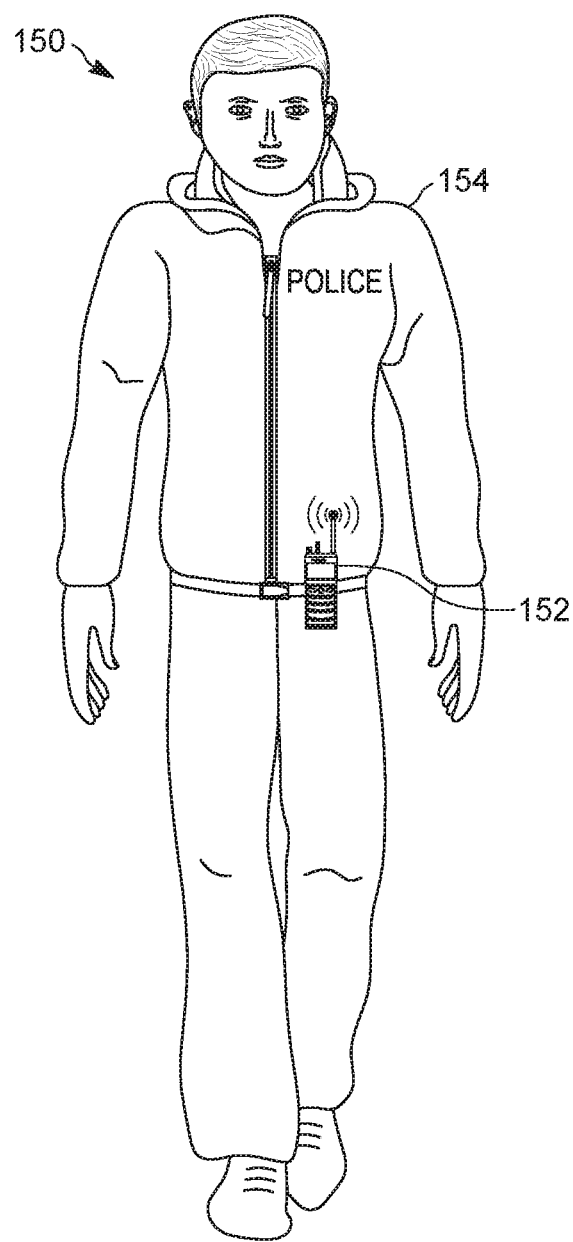
FIG. 1B is a system diagram illustrating a police officer having a computing device communicatively coupled to a clothing having externally-perceivable outputs in accordance with some examples.

Referring now to the drawings, and in particular FIGS. 1A and 1B, example personal and automotive computing devices are disclosed for enabling a more intelligent triggering and propagation of a covert mode status change across devices. As set forth in FIG. 1A, a police vehicle 100 may include an automotive computing device 102 for controlling a covert state of the police vehicle 100 and propagating a covert mode status change to other devices. While a laptop computer is illustrated as the automotive computing device 102 in the example set forth in FIG. 1A, in other embodiments, other types of computing devices could be used, including but not limited to tablet computers, in-vehicle integrated computing devices, vehicular mobile radios, and any other computing device capable of being disposed in a vehicle and wiredly or wirelessly communicating with other computing devices. Furthermore, while a police vehicle is illustrated in FIG. 1A, other types of vehicles could be used as well, including but not limited to, national park vehicles, ambulances, helicopters, planes, drones, special weapons and tactics vehicles, mobile evidence labs, bicycles, motorcycles, and boats.

As set forth in FIG. 1B, a police officer 150 may include a personal computing device 152 for controlling a covert state of a police officer's 150 clothing 154 and propagating a covert mode status change to other devices. While a portable radio computing device is illustrated as the computing device 152 in the example set forth in FIG. 1B, in other embodiments, other types of computing devices could be used, including but not limited to a cellular phone, a tablet computer, a clothing-integrated computing device, a pair of smart glasses, a smart watch, and any other computing device capable of being disposed on or carried by a police officer and wiredly or wirelessly communicating with other computing devices. Furthermore, while a police officer is illustrated in FIG. 1B, other types of public safety personnel could take advantage of the disclosed embodiments as well, including but not limited to, national park officers, medics, special weapons and tactics personnel, robots, drones, evidence technicians, and service dogs or service horses. Still further, same or similar considerations as set forth above could be applied to public safety robots and drones, among other possibilities. Finally, while a hoodie is illustrated in FIG. 1B as the article of clothing 154, other articles of clothing could similarly be used, such as a button-up shirt, a hat, jeans, pants, shoes, or a vest, among other possibilities.

Figure 2A:
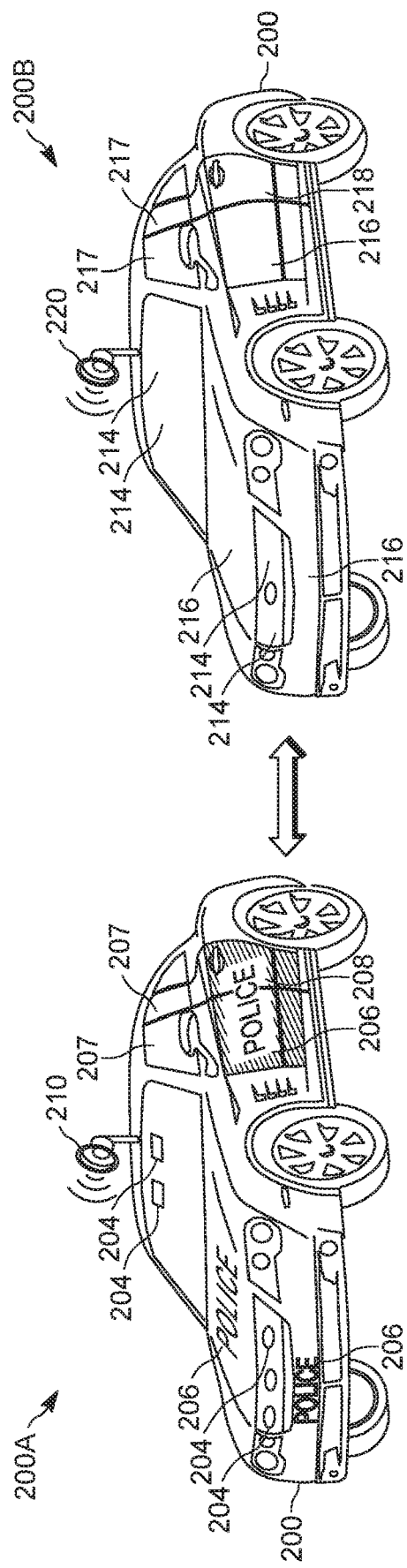
FIG. 2A is a system diagram illustrating externally-perceivable outputs of the police vehicle of FIG. 1A in accordance with some examples.

FIGS. 2A and 2B illustrate example externally-perceivable outputs of each of a police vehicle 200, which may be the same or similar to police vehicle 100 of FIG. 1A, and a police officer's clothing 254, which may be the same or similar to the police officer's clothing 154 of FIG. 1B. As set forth in FIG. 2A, a police vehicle 200 in a non-covert state 200A may include externally-perceivable outputs such as externally-perceivable visible flashing lights 204 that may rotate or strobe various colors of light at various rates, externally-perceivable visible text 206 that identifies the vehicle as a police vehicle or other type of public safety or law enforcement responder, externally-perceivable windows 207 that are un-dimmed, externally-perceivable colored panels 208 that are either colored to match a public safety or law enforcement responder color motif or may be used to enable a display of inverse externally-perceivable text 206 as illustrated in FIG. 2A, and a speaker or horn 210 that broadcasts an externally-perceivable audio output such as a public safety tone, series of tones, or spoken words that may be perceived by other officers, civilians, or suspects nearby. Other types of devices capable of producing externally-perceivable outputs could be added as well.

The externally-perceivable visible flashing lights 204 may include an underlying LED, incandescent, or halogen lamp whose light output is modulated into a strobe, rotating, blinking, or otherwise non-static output, and may comprise a white or colored (e.g., red, blue, etc.) light. The externally-perceivable text 206 (which may also be present on a roof of the vehicle or elsewhere) may be enabled via embedded displays such as light-emitted diode (LED) displays or a liquid crystal display (LCD), mechanically movable roll-signs or mechanically movable coverings that allow backlights to shine through or ambient light to reflect to reveal the underlying text, light emitting phosphors that emit when an energy source such as radiation or electricity is applied, or any other type of switchable text display mechanism. The externally-perceivable colored panels 208 may be similarly configured. The externally-perceivable windows 207 may be electrochromic, photochromic, thermochromic, suspended particle, and/or polymer dispersed liquid crystal devices. The externally-perceivable speaker or horn 210 may be a loudspeaker, an emergency tone generator, a siren, a car horn, or some other acoustic generating device that can generate and output a perceivable audio signal such as a tone, music, speech, or other type of audio.

In contrast to the police vehicle 200 in a non-covert state 200A, a police vehicle 200 in a covert state 200B may include visible flashing lights 214 that are turned off or retracted, visible text 216 elements that are turned off, retracted, or covered, windows 217 that are dimmed, colored panels 218 that are either colored to match a plain color over the unmarked vehicle or turned off, and a speaker or horn 220 that is turned off, muted, or not driven. The visible flashing lights 214 may have a same or similar structure to the visible flashing lights 204 but are maintained in a different covert state, the visible text 216 elements may have a same or similar structure to the visible text 206 elements but are maintained in a different covert state, the windows 217 may have a same or similar structure to the windows 207 but are maintained in a different covert state, the colored panels 218 may have a same or similar structure to the colored panels 208 but are maintained in a different covert state, and the speaker or horn 220 may have a same or similar structure to the speaker or horn 210 but is maintained in a different state in covert mode compared to non-covert mode.

As set forth in FIG. 2B, a police officer's clothing 254 in a non-covert state 254A may include externally-perceivable outputs such as externally-perceivable text 256, 258 on respective front and rear sides (and/or other areas such as sleeves and lateral sides) of the clothing that identifies the wearer as a police officer or other type of public safety or law enforcement responder. Other types of devices capable of producing externally-perceivable outputs could be added as well, including but not limited to fabric speakers, among other possibilities. The externally-perceivable visible text 256, 258 may be enabled via embedded displays such as organic light-emitted diode (OLED) displays or other types of displays, light emitting phosphors that emit when an energy source such as radiation or electricity is applied, or any other type of switchable text display mechanism. In other embodiments, the externally-perceivable visible text 256, 258 may be enabled via underlying switchable and powered luminescent colored panels that are stitched over via fabric portions of the clothing 254 to form the text portions of the visible text 256, 258 when illuminated. Other possibilities exist as well.

In contrast to the police officer's clothing 254 in a non-covert state 254A as set forth in FIG. 2B, a police officer's clothing 254 in a covert state 254B may include text 266, 268 on respective front and rear sides of the clothing that are either actively set to a color to match a plain color of the plainclothes surrounding the text region or are switched off. The text 266, 268 elements may have a same or similar structure to the text 256, 258 elements but are maintained in a different covert state.

Figure 3:
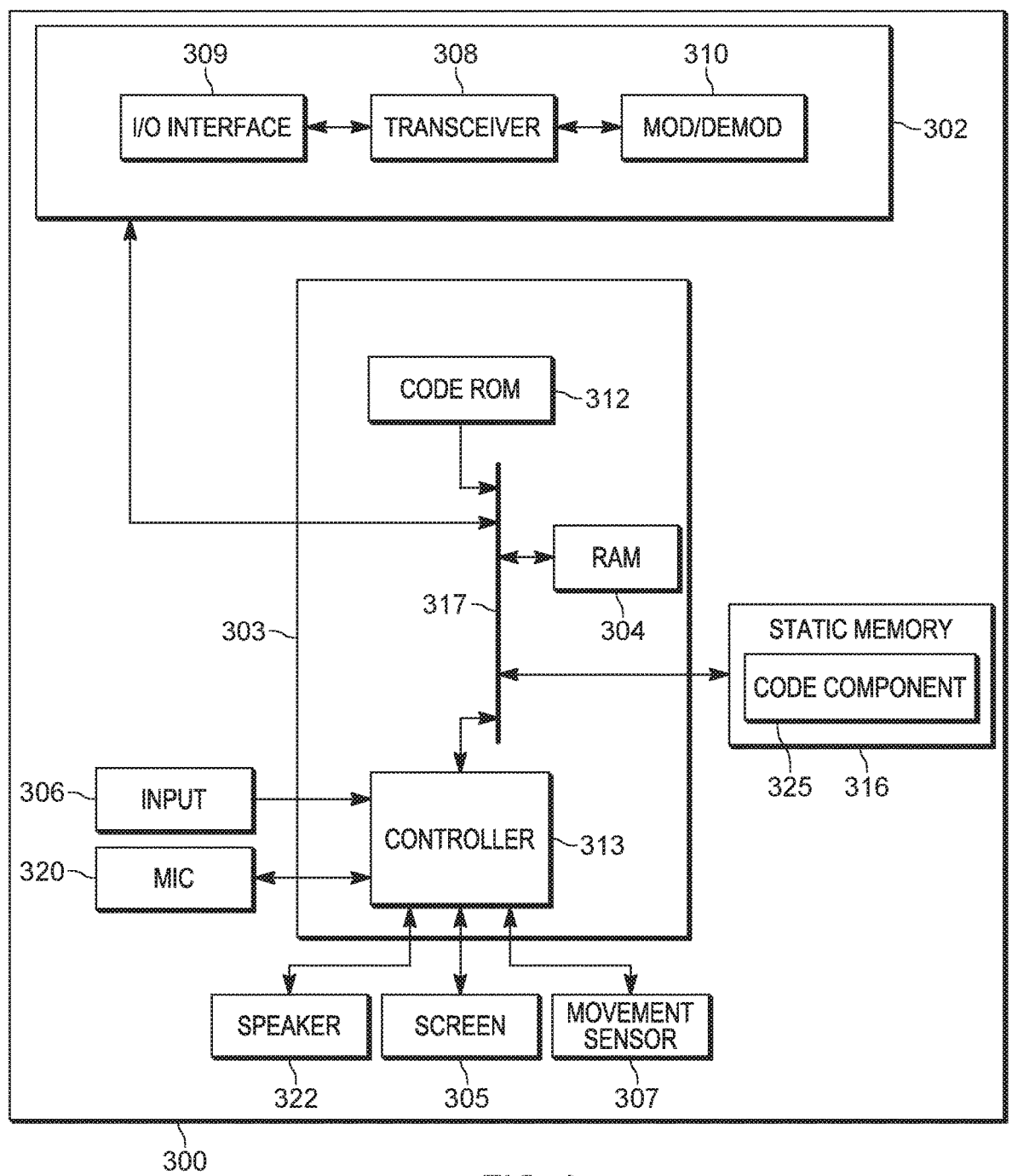
FIG. 3 is a device diagram showing a device structure of the computing devices of FIGS. 1A and 1B in accordance with some examples.

Referring to FIG. 3, a schematic diagram illustrates a computing device 300 according to some embodiments of the present disclosure. Computing device 300 may be, for example, the same as or similar to the automotive computing device 102 of FIG. 1A and/or the personal computing device 152 of FIG. 1B. As shown in FIG. 3, computing device 300 includes a communications unit 302 coupled to a common data and address bus 317 of a processing unit 303. The computing device 300 may also include an input unit (e.g., keypad, pointing device, etc.) 306 and a display screen 305, each coupled to be in communication with the processing unit 303. In some examples, computing device 300 may also include a movement sensor 307.

In some embodiments, a microphone 320 may capture audio from a user that is further vocoded by processing unit 303 and transmitted as voice stream data by communication unit 302 to other mobile or portable radios and/or other devices, and a communications speaker 322 may reproduce audio that is decoded from voice streams of voice calls received from other mobile or portable radios and/or from an infrastructure device via the communications unit 302.

The processing unit 303 may include a code Read Only Memory (ROM) 312 coupled to the common data and address bus 317 for storing data for initializing system components. The processing unit 303 may further include an electronic controller 313 coupled, by the common data and address bus 317, to a Random Access Memory (RAM) 304 and a static memory 316.

The motion sensor 307 may include one or more movement sensors (such as an accelerometer, magnetometer, and/or gyroscope) that may periodically or intermittently provide to the controller 313 indications of orientation, direction, steps, acceleration, and/or speed, perhaps accompanying other additional information, as PCIEs. An accelerometer is a device that measures acceleration. Single and multi-axis models are available to detect magnitude and direction of the acceleration as a vector quantity, and can be used to sense orientation, acceleration, vibration shock, and falling. A gyroscope is a device for measuring or maintaining orientation, based on the principles of conservation of angular momentum. One type of gyroscope, a microelectromechanical system (MEMS) based gyroscope, uses lithographically constructed versions of one or more of a tuning fork, a vibrating wheel, or resonant solid to measure orientation. Other types of gyroscopes could be used as well. A magnetometer is a device used to measure the strength and/or direction of the magnetic field in the vicinity of the device, and can be used to determine a direction in which a person or device is facing. Other types of movement sensors could additionally, or alternatively, be used as well.

The communications unit 302 may include one or more wired or wireless input/output (I/O) interfaces 309 that are configurable to communicate with devices having switchable externally-perceivable outputs, with other mobile or portable radios, and/or with other types of accessory devices.

The communications unit 302 may include one or more wireless transceivers 308, such as a DMR transceiver, a P25 transceiver, a Bluetooth transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, and/or other similar type of wireless transceiver configurable to communicate via a wireless radio network. The communications unit 302 may additionally or alternatively include one or more wireline transceivers 308, such as an Ethernet transceiver, a Universal Serial Bus (USB) transceiver, a Tip, Ring, Sleeve (TRS) connection, a Tip, Ring, Ring, Sleeve (TRRS) connection, or similar transceiver configurable to communicate via a twisted pair wire, a coaxial cable, a fiber-optic link, an audio jack, or a similar physical connection to a wireline network. The transceiver 308 is also coupled to a combined modulator/demodulator 310.

The controller 313 has ports for coupling to the input unit 306 and the microphone unit 320, and to the display screen 305 and speaker 322.

The controller 313 includes one or more logic circuits, one or more hardware processors, one or more microprocessors, one or more ASIC (application-specific integrated circuits) and one or more FPGA (field-programmable gate arrays), and/or another electronic device.

Figure 5:
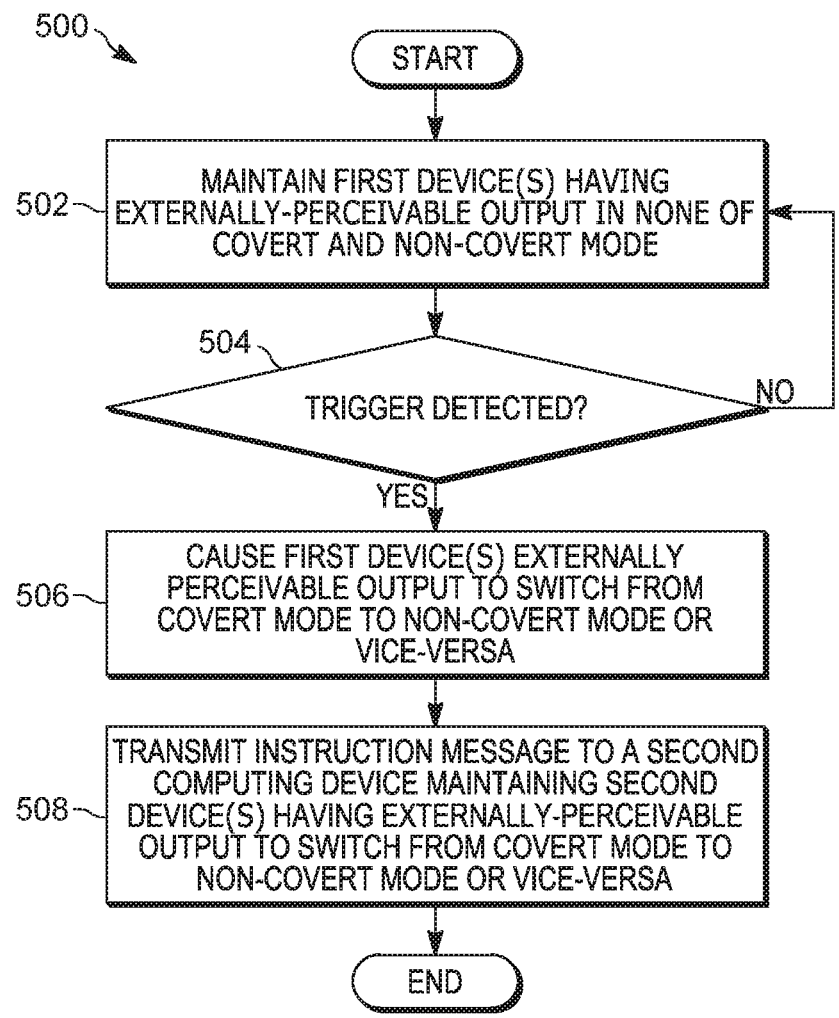
FIG. 5 illustrates a flow chart setting forth process steps for triggering and propagating a covert mode status change among other devices in accordance with some examples.

Static memory 316 may store operating code (e.g. as code component 325) for the controller 313 that, when executed, performs one or more of the triggering and covert mode status change propagation steps set forth in FIG. 5 and accompanying text. Static memory 316 may also store, permanently or temporarily, triggering rules disclosed herein as determining when to trigger a covert mode status change.

Static memory 316 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, to name a few.

Figure 4:
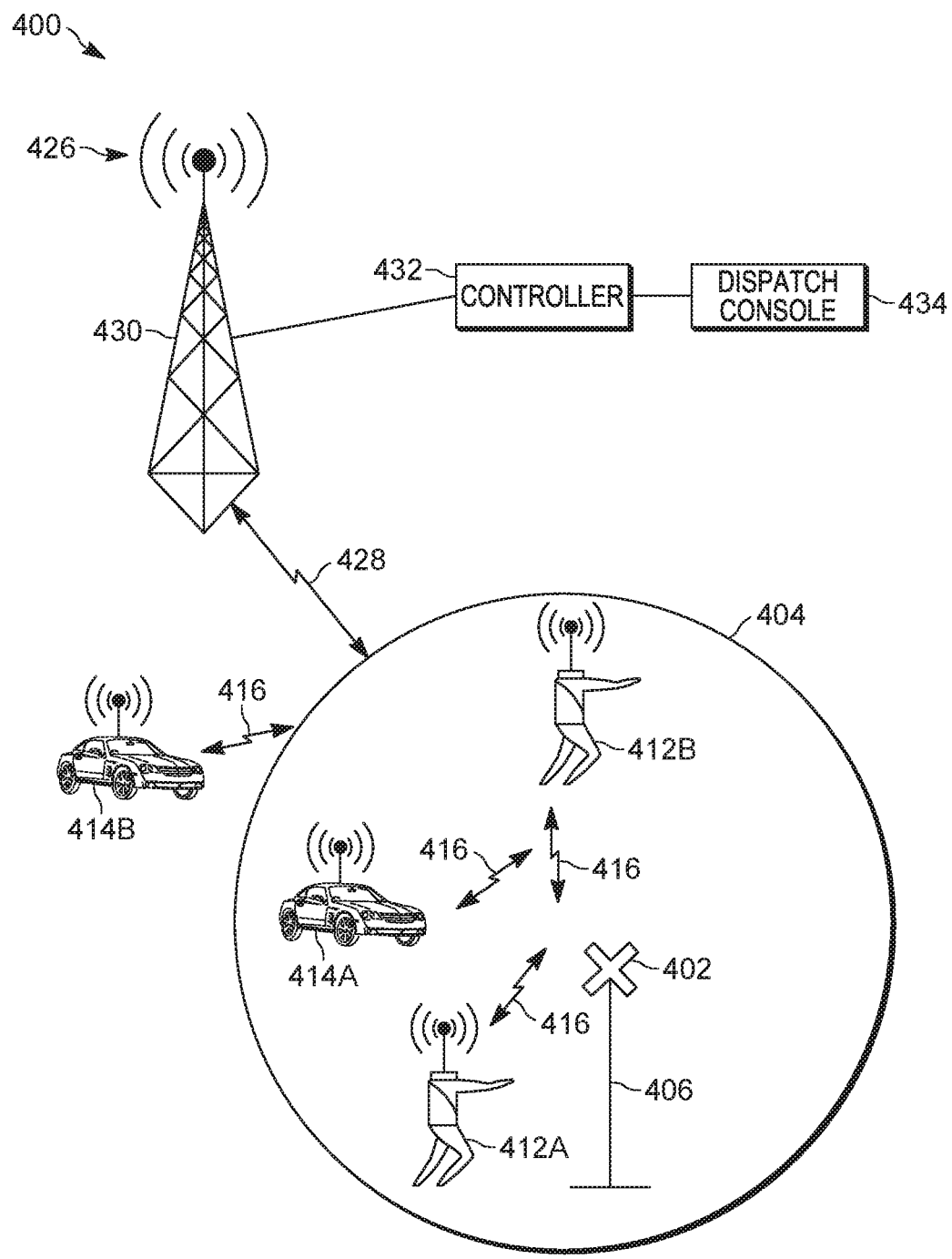
FIG. 4 is a plan view of an example incident scene in which the process steps of FIG. 5 may be executed in accordance with some examples.

FIG. 4 sets forth an example incident/response area 400 that may have a defined incident location 402 and may have a geofenced response boundary 404 defined at a static or variable distance 406 from the defined incident location 402. Various potential vehicular and police officer responders (each of which may already be a member of a corresponding incident response group, such as police and/or traffic control) may already be on scene at the defined incident location 402 or within the geofenced response boundary 404 at the time of the incident. Each potential responder may be a person or vehicle, or other responder type, with an associated computing device (e.g., portable or mobile radio) capable of communicating wiredly or wirelessly with each other and/or with a RAN 426, and each computing device also having control over one or more corresponding devices having an externally-perceivable output.

As illustrated in FIG. 4, such potential responders may include, for example, first and second responding police officers 412A, 412B (e.g., an officer operating on-foot) and first and second responding police vehicles 414A, 414B. Each of the first and second responding police vehicles 414A, 414B may be the same or similar to the police vehicles 200 of FIG. 2A and 100 of FIG. 1A and each of the first and second responding police officers 412A, 412B may be the same or similar to the police officer 150 of FIG. 1B wearing a same or similar clothing 254 set forth in FIG. 2B.

Each of the police officers and/or police vehicles 412A, 412B, 414A, 414B may, in one example, already be actively using RF resources 428 of the RAN 426. RAN 426 may implement over RF resources 428 wireless links that, for example, enable a conventional or trunked land mobile radio (LMR) standard or protocol such as ETSI Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, RAN 426 may additionally or alternatively implement over RF resources 428 wireless links that, for example, enable a Long Term Evolution (LTE) protocol including multimedia broadcast multicast services (MBMS), an open mobile alliance (OMA) push to talk (PTT) over cellular (OMA-PoC) standard, a voice over IP (VoIP) standard, or a PTT over IP (PoIP) standard. Other types of wireless protocols could be implemented as well. The RAN 426 is illustrated in FIG. 4 as providing coverage substantially throughout the incident/response area 400, illustrated in FIG. 4 as including a single fixed terminal 430 coupled to a controller 432 (e.g., radio controller, call controller, PTT server, zone controller, MME, BSC, MSC, site controller, Push-to-Talk controller, or other network device) and including a dispatch console 434 operated by a dispatcher. Accordingly, each of the police officers and/or police vehicles 412A, 412B, 414A, 414B could communicate with one another via the RAN 426, or via ad-hoc or direct mode communications links 416. In still other examples, other types of responders may communicate with one another via infrastructure or ad-hoc wired communication connections.

In some embodiments, the police officers 412A, 412B may communicate on one talkgroup while the police vehicles 414A, 414B communicate on another talkgroup, while in other embodiments, they may all communicate on a same talkgroup. The defined geofenced response boundary 404 in FIG. 4 may be set by one of the responders in the field or by the dispatcher at the dispatch console 434, and may act as a geofence for triggering a covert mode status change upon an officer, vehicle, or other user or device entering or exiting the geofenced area, among other possibilities.

For example, an incident occurring at the defined incident location 402 may be or include a robbery in progress, a planned drug bust, or a mob action. In general, different types of crimes require different types of approaches. For example, in a case such as a planned drug bust where the arriving officers and vehicles may want to maintain a covert state until the last possible second in order to avoid tipping off one of the participants in a transaction. In a different case such as a mob action, the arriving officers and vehicles may want to maintain a non-covert state in order to provide a visual deterrent to the mob action. In some cases, circumstances may change throughout an incident such that changes in incident context may trigger a change in strategy requiring a change from a covert state to a non-covert state or vice versa or perhaps back again, among other possible permutations.

Turning now to FIG. 5, a flow chart sets forth a method 500 for triggering and propagating a covert mode status change among other devices. Method 500 begins at step 502, where a computing device maintains one or more first devices, each having an externally-perceivable output, in one of a covert mode in which indications of law enforcement activity are caused to be hidden or inactivated via the externally-perceivable output and a non-covert mode in which the one or more indications of law enforcement activity are caused to be revealed or activated via the externally-perceivable output. For example, this may include the police officer's portable radio computing device 152 of FIG. 1B maintaining, via a wired or wireless connection, an externally-perceivable visible text 256, 258, 266, 268 device on respective front and rear sides of the officer's clothing 254 in one of a covert state (deactivated or otherwise matching the plain clothes of the officer to conceal the wearer's membership in a law enforcement organization) and a non-covert state (enabled to display text or other graphics or colors identifying the wearer's membership in a law enforcement organization and providing a deterrent effect). In another example, this may include the police vehicle's mobile radio computing device 102 of FIG. 1A controlling, via a wired or wireless connection, an externally-perceivable visible text 206, 216 on respective front and sides of the police vehicle 100 in one of a covert state (deactivated or otherwise matching the color of the surrounding portions of the vehicle to conceal the vehicle's association with a law enforcement organization) and a non-covert state (enabled to display text identifying the vehicle as associated with a law enforcement organization and providing a deterrent effect). In other embodiments, instead of the externally-perceivable outputs being communicably coupled to the computing device via a wired and/or wireless connection, the externally-perceivable outputs may be physically integrated with the computing device (e.g., as externally visible portions of the computing device housing) and coupled to a processor of the computing device via internal wiring traces, among other possibilities.

In one embodiment, the computing device having one or more devices each having externally-perceivable outputs may operate in a default covert state based on a type of officer or vehicle (beat cop and corresponding vehicle, traffic control and corresponding vehicle, detective and corresponding vehicle, commander and corresponding vehicle, etc.) or a policy of the organization with which the officer or vehicle is associated. For example, computing devices associated with beat cops or traffic control officers may default to maintaining its one or more devices each having externally-perceivable outputs in a non-covert state in order to provide a deterrent effect as the officer or vehicle patrols a beat or drives to/from an assigned traffic control point. In another example, computing devices associated with detectives or commanders may default to maintaining their one or more devices each having externally-perceivable outputs in a covert state in order to provide more discretion during their investigations. These default states may then change in response to a detected covert mode status change trigger.

At step 504, the computing device may detect a covert mode status change trigger, which may be a covert mode trigger (e.g., a trigger indicating a change should be made from a non-covert state to a covert state) or a non-covert mode trigger (e.g., a trigger indicating a change should be made from a covert state to a non-covert state). The trigger detected at step 504 may be an internally generated trigger, i.e., generated at the computing device itself based on some logic as a function of a determined context of the computing device (or a user or vehicle associated with the computing device), or may be an externally generated trigger, i.e., generated at some other computing device and received at the computing device via an I/O interface such as the I/O interface 309 of computing device 300 of FIG. 3.

In one example, an internally generated covert mode trigger or non-covert mode trigger may be generated by the computing device detecting a first change in context, such as detecting that it has passed into or passed out of a geofenced area associated with a particular incident. For example, and in reference to FIG. 4, as the police vehicle 414B moves toward the defined incident location 402 it may pass the geofenced response boundary 404 set up by a dispatcher at dispatch console 434 or by one of the police officers 412A, 412B already at/near the defined incident location 402. Based on a type of incident occurring at the defined incident location 402 and communicated to the computing device, or based on an indication of whether the geofenced area associated with the geofenced response boundary 404 is associated with a covert-mode area or a non-covert mode area (information similarly provided to the computing device along with the geofence definition), the police vehicle 414B may generate one of a covert mode trigger and a non-covert mode trigger when it determines it has crossed the geofenced response boundary 404 and into the geofenced area defined by the geofenced response boundary 404 (e.g., by comparing its own determined GPS or triangulated location with the received geofence definition). Which one of the covert mode trigger and the non-covert mode trigger is raised may depend on the trigger identified as being associated with the geofenced response boundary 404 and provided to the computing device, or may depend on the particular type of incident identified as occurring at the defined incident location 402 location and provided to the computing device, perhaps cross-referenced by the computing device with a locally-maintained or remotely accessed database that maps types of incidents to whether the arriving police vehicle or police officer should be maintained in a covert state or non-covert state. When detecting that it is passing out of the geofenced area, the officer or vehicle's computing device may cause the externally-perceivable outputs to return to (or remain in) their default covert state.

In another example, the internally generated covert mode trigger or non-covert mode trigger may be generated by the computing device detecting a second change in context such as detecting that it, or a radio communication device associated with it, has changed talkgroup channels. For example, and in reference to FIG. 4, one of the police officers 412A may be carrying a portable radio such as the computing device 152 set forth in FIG. 1 (and which may also serve as the computing device 300 for controlling externally-perceivable outputs associated with the police officer 412A), and the police officer in possession of the portable radio computing device 152 may change a talkgroup channel of the portable radio computing device 152 via an external knob or other input mechanism. Which one of the covert mode trigger and the non-covert mode trigger is raised based on the talkgroup channel change may depend on the original talkgroup selection and/or the new talkgroup selection, each of which may be cross-referenced with a locally-maintained or remotely accessed database that maps talkgroup channels with an assigned current covert state. If the original talkgroup selection is currently associated with a covert state and the new talkgroup selection is currently associated with a non-covert state, a non-covert mode trigger may be raised by the portable radio computing device 152. If, on the other hand, the original talkgroup selection is currently associated with a non-covert state and the new talkgroup selection is currently associated with a covert state, a covert mode trigger may be raised by the portable radio computing device 152. In some embodiments, a level of hysteresis may be applied to the talkgroup selection, e.g., requiring that a talkgroup be selected for greater than a minimum period of time before executing a covert state change associated with the talkgroup selection, such as greater than or equal to 1 s, 5 s, or 10 s.

In still further embodiments, the portable radio computing device 152 may be configured to periodically request updated mappings and/or periodically receive updated mappings of talkgroup covert states (via its I/O interface or via an input interface, for example), and upon detecting a change in state of a current talkgroup (even without changing talkgroups), raise one of a covert mode trigger and a non-covert mode trigger. Similar actions may be taken by a vehicular mobile radio computing device 102 operating in a police vehicle 100, among other devices and other possibilities.

In a still further example, the internally generated covert mode trigger or non-covert mode trigger may be generated by the computing device detecting a change in context via one or more other devices communicatively coupled to the computing device via a personal area network (PAN), vehicle area network (VAN), local area network (LAN), wide-area-network (WAN), ad-hoc network (AHN), or disruption tolerant network (DTN). For example, a holster sensor (not shown) associated with the officer 150 of FIG. 1B and communicatively coupled to the portable radio computing device 152 may detect an unholstering of a weapon, and transmit a signal to the portable radio computing device 152 (via a wired and/or wireless link) to the portable radio computing device 152 indicative of the sensed unholstering. On receipt of the unholstering signal, the portable radio 152 may determine that a local context of the police officer 150 has changed, and may internally generate a non-covert mode trigger to reveal the user as a police officer and provide an increased deterrent effect. Other externally generated context change signals could be received at the portable radio 152 as well, including biometric information associated with a physical health state of the police officer 150, orientation information associated with an orientation and/or speed of action or speed of orientation change of the police officer 150 that may be indicative of an altercation or life-threatening situation, and a threshold number of other officers (in a covert or non-covert status) that are detected to be within a threshold distance of the police officer 150, among other possibilities.

For a computing device such as automotive computing device 102 in police vehicle 100, context information may include whether a suspect is seated in a rear of the vehicle, a speed or acceleration of the vehicle, a state of any one or more doors or trunks of the vehicle, a number of officers nearby the vehicle or a number of other police vehicles near the vehicle, and a state of a siren or light switch of the vehicle, among other possibilities.

In other embodiments, the covert mode status change trigger detected at step 504 may be an externally generated trigger received at the computing device in a covert mode status change trigger message via an I/O interface of the computing device such as the I/O interface 309 of the computing device 300 of FIG. 3. In one example, and with reference to FIG. 4, a dispatcher at dispatch console 434 may cause a covert mode status change trigger message to be generated and transmitted to the computing device via fixed terminal 430 base station and RF resources 428. In still another example, another device such as police vehicle 414A may generate a covert mode status change trigger message and may transmit (e.g., broadcast, multicast, or unicast) the message to other nearby devices via the RAN 426 or via ad-hoc or direct mode communications links 416. In some embodiments where the detected trigger is externally generated, the computing device may determine a relative rank or priority of a user and/or device that generated the external trigger message, and may refrain from making the covert state change indicated and relaying the trigger message on to other devices if the determined relative rank is lower than a predetermined threshold rank or priority, and/or is lower than their current rank or priority of the receiving device or officer associated therewith. In those circumstances, for example, the receiving computing device may wait for a confirmation covert mode status change message to be transmitted from someone with a higher rank or priority, and only upon receipt of the confirmation message then make a local covert mode state change and further propagate the covert mode status change message to other devices.

If no covert mode status change trigger is detected by the computing device at step 504, processing returns to step 502. If, on the other hand, a covert mode status change trigger is detected by the computing device at step 504, processing proceeds to step 506, where the computing device causes the one or more externally-perceivable outputs of devices under its control to switch from the covert state to the non-covert state when the covert mode status change trigger is a non-covert mode trigger and causes the one or more externally-perceivable outputs of devices under its control to switch from the non-covert state to the covert state when the covert mode status change trigger is a covert mode trigger. For example, the computing device may cause externally perceivable outputs of a police vehicle to make one of the transitions already set forth above with respect to FIG. 2A or may cause externally perceivable outputs of a police officer's clothing to make one of the transitions already set forth above with respect to FIG. 2B. In some embodiments, instead of automatically and immediately making the covert mode state change locally, the computing device may first initiate a prompt to a user (wearer of the clothing, driver of the vehicle, etc.) requesting confirmation to make the covert state change indicated by the detected covert mode status change trigger. Only after receiving confirmation from the user and/or driver via the computing device, perhaps via an input interface such as that input interface 306 of the computing device 300 of FIG. 3, would the computing device then execute steps 506 and 508.

In addition, and still responsive to detecting the covert mode status change trigger at step 504, at step 508, the computing device wiredly or wirelessly relays (e.g., transmits) a covert mode status change message to one or more second computing devices each maintaining one or more second devices each having a second externally-perceivable output to one of switch from the covert state to the non-covert state when the non-covert mode trigger is detected and switch from the non-covert state to the covert state when the covert mode trigger is detected. The computing device may transmit the covert mode status change message to the one or more second computing devices via one or more of a PAN, a VAN, a LAN, a WAN, an AHN, or a DTN communicatively coupled to the computing device. The second computing devices may then change their covert state or make their own determination of whether to change their covert state, and further pass along the covert mode status change message to other third computing devices.

Figure 6:
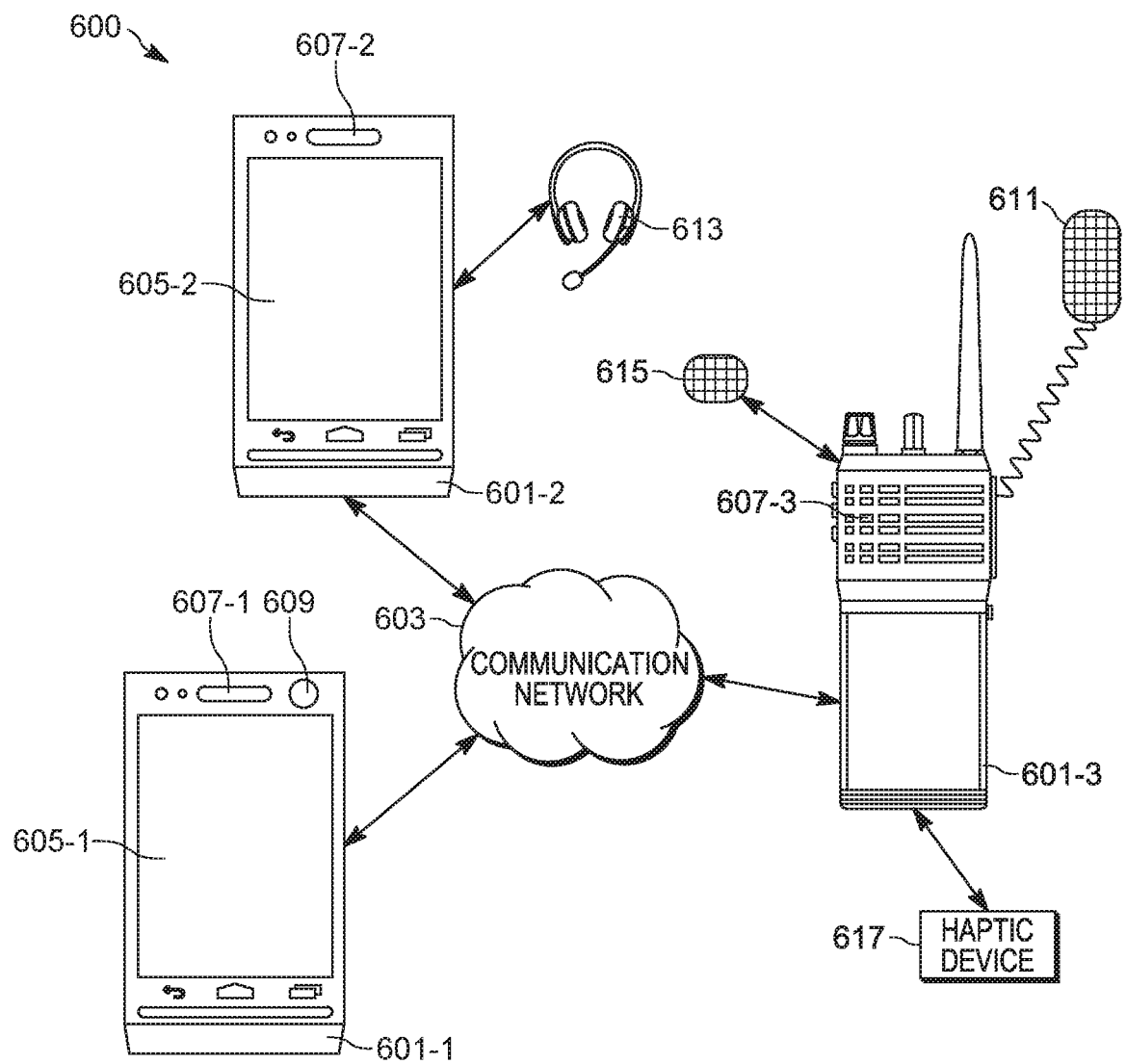
FIG. 6 depicts a system for triggering and propagating of a covert mode status change using configuration protocol data, in accordance with some examples.

Attention is next directed to FIG. 6 which depicts a system 600 for triggering and propagating of a covert mode status change using configuration protocol data. As depicted, the system 600 comprise a plurality of computing devices 601-1, 601-2, 602-3 (interchangeably referred to hereafter, collectively, as the computing devices 601 and, generically, as a computing device 601), in communication via a communications network 603 (interchangeably referred to hereafter, as the network 603) using respective communication links thereto, which may be wireless and/or at least partially wired as desired. The network 603 may be any network described heretofore and/or any other suitable communication network. Communication links between components of the system 600 are depicted as double-headed arrows.

While three computing devices 601 are depicted, the system 600 may comprise as few as two computing devices 601, and more than three computing devices 601, and/or any suitable number of computing devices 601, which may depend on how many respective operators of the computing devices 601 are deployed to an incident and/or are assigned to conduct covert surveillance, and the like.

While each of the computing devices 601 are depicted as mobile communication devices, the computing devices 601 may comprise any computing device described heretofore having externally-perceivable outputs and/or externally-perceivable output devices and/or any suitable computing device having externally-perceivable outputs and/or externally-perceivable output devices.

Indeed, as depicted, each of the computing devices 601 include at least one device that produces externally-perceivable outputs, as described above. Hereafter, such devices that produce externally-perceivable outputs are referred to as externally-perceivable output devices.

For example, each of the computing device 601-1, 601-2 includes a respective display screen 605-1, 605-2 (interchangeably referred to hereafter, collectively, as the display screens 605 and, generically, as a display screen 605), each of which emits light that may be externally perceivable. Similarly, each the computing device 601 includes a respective speaker 607-1, 607-2, 607-3 (interchangeably referred to hereafter, collectively, as the speakers 607 and, generically, as a speaker 607), each of which emits sound that may be externally perceivable. Similarly, the computing device 601-1 includes a light 609 which emits light that may be externally perceivable (e.g. in a flashlight mode); the light 609 may be used as one or more of a flashlight, a "flash" for a camera of the computing device 601-1, and the like. Hence, each of the display screens 605, the speakers 607 and the light 609 are externally-perceivable output devices.

Furthermore, each of the computing device 601-2, 601-3 include external accessories and/or peripheral devices which may or may not be an externally-perceivable output device. For example, the computing device 601-2 includes a remote-speaker microphone (RSM) 611 which emits sound, and which may be used in place of, and/or in addition to, the speaker 607-3; hence the RSM 611 may comprise an externally-perceivable output device. The RSM 611 may further include a body-worn camera, and the like.

However other external accessories and/or peripheral devices may not be externally-perceivable output devices; for example, the computing device 601-2 includes a headset 613 that may be used by an operator of the computing device 601-2 to communicate covertly. Similarly, the computing device 601-3 includes an earpiece 615 that may be used by an operator of the computing device 601-3 to communicate covertly; while the earpiece 615 is external to the computing device 601-3, earpieces integrated with computing device 601 are within the scope of the present disclosure. Similarly, the computing device 601-3 includes a haptic device 617 that may be worn by an operator of the computing device 601-3 (e.g. next to their body) to covertly receive notifications, for example in place of a notification device such as the speaker 607-3; indeed each of the display screens 605, the speakers 607, the light 609, and the RSM 611 may also be used to provide externally perceivable notifications.

Furthermore, each of the computing devices 601 may include other types of externally-perceivable output device including, but not limited to, a "flash" for a camera (which may include, for example, the light 609 operated in a "flash" mode for a camera at the computing device 601-1), haptic devices and/or vibration devices that are integrated with a computing device 601 (e.g. which are not worn next to the body of an operator user), radios and/or other electromagnetic radiation emitting devices that emit electromagnetic emissions that may be detected, for example, by an electromagnetic emission and/or radio detection device, and the like.

Indeed, as described above, one or more of the externally-perceivable output devices are generally operable in a non-covert manner or covert state, and may be operable in a convert manner or a covert state. Furthermore, like computing devices described heretofore, the computing devices 601 may change between a non-covert mode and a covert mode. According to the method 500, in some examples, one of the computing devices 601, having changed from a non-covert mode to a covert mode, may transmit an instruction message (e.g. at the step 508) to the other computing devices 601 to cause the other computing devices 601 to also change to a covert mode, which causes the externally-perceivable output devices be operated in a covert manner and/or state.

In some examples, however, in the method 500, the instruction message may cause the other computing devices 601 receiving the instruction message to enter a default covert mode, which may or may not be compatible with the covert mode of the computing device 601 transmitting the instruction message. For example, in some examples, the computing device 601-1, when implementing the method 500, may transmit such an instruction message and the default covert mode of the computing device 601-1 may include dimming the display screen 603-1, turning off the light 609, and reducing audio output of the speaker 607-1 to a given level; however, a default covert mode of the computing device 601-2 receiving the instruction message may include routing audio from the speaker 607-2 to the headset 613, but not dimming the display screen 605-2. Hence, when the operators of the computing devices 601 are in the dark surveilling a suspect, and the computing device 601-1 transmits an instruction message (e.g. at the step 508) to cause the other computing devices 601-2, 601-3 to switch to a covert mode, the display screen 605-2 of the computing device 601-2 may inadvertently cause the suspect to detect the surveillance.

Hence, as described hereafter, the computing devices 601, and/or the instruction message of the method 500, may be adapted to place each of the computing devices 601 into a covert mode where the respective externally-perceivable output devices are controlled in a manner similar to and/or aligned with the externally-perceivable output devices of the computing device 601 transmitting the instruction message, for example to about normalize behavior of the externally-perceivable output devices across all the computing devices 601.

In some examples, each of the computing devices 601 may store one or more profiles, each of the one or more profiles classified as covert or non-covert, each of the one or more profiles comprising a mapping between configuration data, defining respective behavior of one or more externally-perceivable output devices (e.g. of the computing device 601 where a profile is stored), and configuration protocol data for controlling respective one or more externally-perceivable output devices at one or more second computing devices 601.

In an example, where the computing device 601-1 is referred to as a first computing device 601-1 and the computing devices 601-2, 601-3 are referred to second computing devices 601-2, 601-3, when the first computing device 601-1 enters a covert mode, the externally-perceivable output devices of the first computing device 601-1 are controlled according to a selected "covert" profile, which may be a default covert profile, and/or a covert profile as selected based on a trigger, that causes the first computing device 601-1 to enter the covert mode. The selected covert profile is used to control the externally-perceivable output devices (e.g. the display screen 605-1 and the light 609) of the first computing device 601-1.

When entering the covert mode, the first computing device 601-1 also transmits an instruction message, to the second computing devices 601-2, 601-3, the instruction message comprising: a status change message to place each of the second computing devices 601-2, 601-3 in a respective covert mode; and covert-configuration protocol data mapped to the covert-configuration data of the covert profile, such that the respective one or more externally-perceivable output devices, at the second computing devices 601-2, 601-3, are controlled according to the covert-configuration protocol data.

Figure 7:
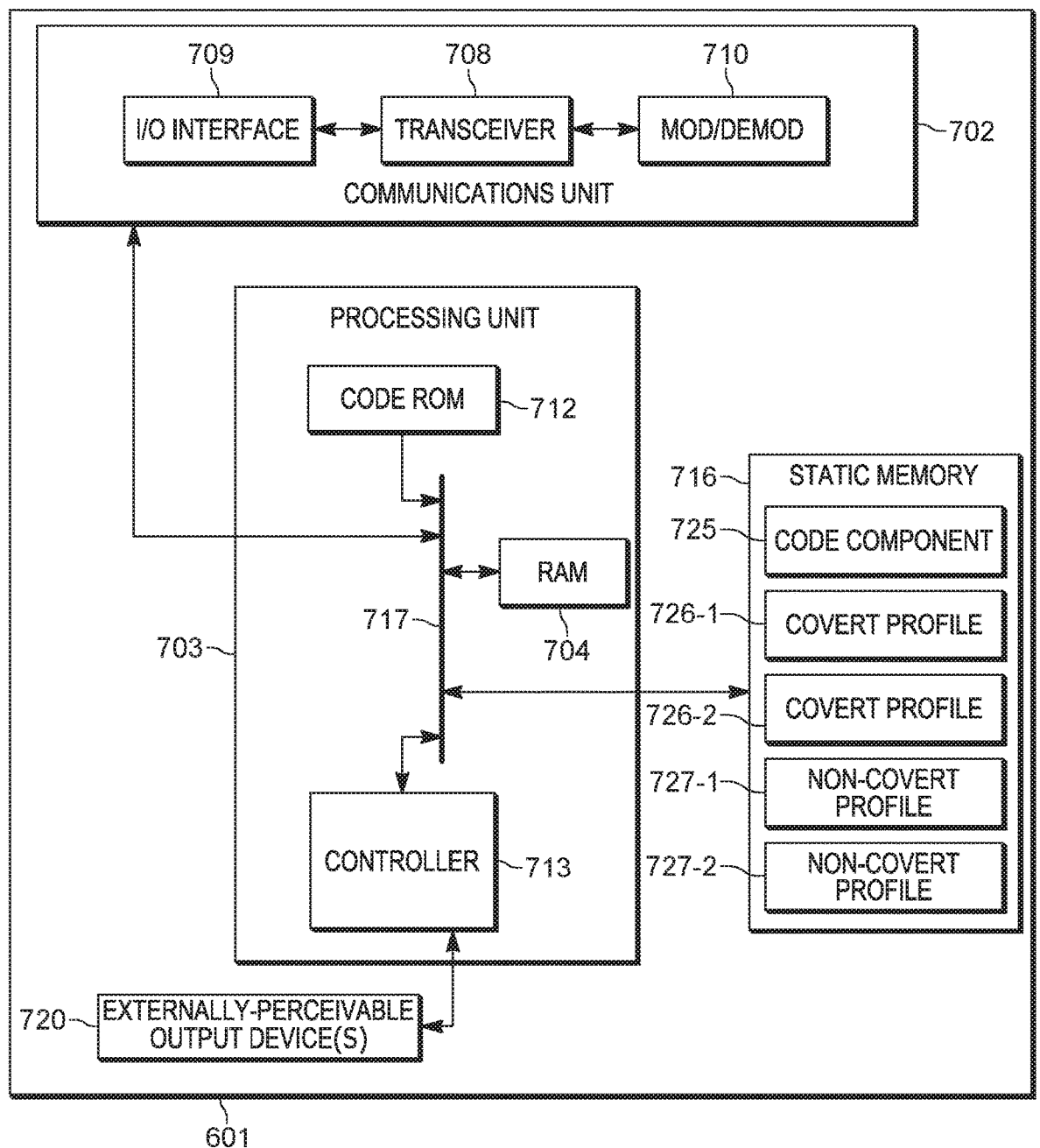
FIG. 7 is a device diagram showing a device structure of a computing device for triggering and propagating of a covert mode status change using configuration protocol data in accordance with some examples.

Attention is next directed to FIG. 7, which depicts a schematic block diagram of an example of a computing device 601, which is substantially similar to the computing device 300 with like elements having like numbers, however in a "700" series rather than a "300" series. Furthermore, while not all components of each of the computing device 601 are depicted in FIG. 7, they are nonetheless present and/or the configuration of the example computing device 601 depicted in FIG. 7 may be adapted for the functionality and/or components of any computing device 601 described herein.

Hence, in general, the example computing device 601 depicted in FIG. 6 comprises: a communications unit 702, a processing unit 703, a Random-Access Memory (RAM) 704, one or more wireless transceivers 708, one or more wired and/or wireless input/output (I/O) interfaces 709, a combined modulator/demodulator 710, a code Read Only Memory (ROM) 712, a controller 713, a static memory 716 and a common data and address bus 717. Furthermore, the example computing device 601 comprises one or more externally-perceivable output devices 720. As depicted, the static memory 716 stores a code component 725, and one or more profiles 726-1, 726-2, 727-1, 727-2.

Furthermore, each of the memories 712, 716 comprise non-transitory memories and/or non-transitory computer readable mediums. While not depicted, the computing device 601 may further comprise one or more input devices, one or more microphones, one or more movement sensors, and the like, similar to the computing device 300; indeed, the computing device 601 may comprise other types of components including, but not limited to one or more light sensors, and the like. Furthermore, the one or more externally-perceivable output devices 720 may comprise any one or more externally-perceivable output devices described heretofore including, but not limited to any suitable combination of one or more of display screens, lights, speakers, notification devices, camera flashes, electromagnetic radiation emitting devices (e.g. the communications unit 702) and the like.

The components of the computing device 601 may hence be otherwise similar to like components of the computing device 300, as described above. In particular, when the computing device 601 includes, and/or is in communication with, external accessories and/or peripheral devices, the computing device 601 may communicate with such external accessories and/or peripheral devices, in wired or wireless manner, via the communications unit 702.

The one or more profiles 726-1, 726-2, 727-1, 727-2 are each generally classified as covert or non-covert. For example the profiles 726-1, 726-2 are classified as covert, and are interchangeably referred to hereafter, collectively, as the covert profiles 726 and, generically, as a covert profile 726. Similarly, the profiles 727-1, 727-2 are classified as non-covert, and are interchangeably referred to hereafter, collectively, as the non-covert profiles 727 and, generically, as a non-covert profile 727.

The one or more profiles 726, 727 may generally be used to control the one or more externally-perceivable output devices 720 when the computing device enters a covert mode or a non-covert mode. For example, when the computing device 601 enters a covert mode, one of the covert profiles 726 is selected to control the one or more externally-perceivable output devices 720, whereas when the computing device 601 enters a non-covert mode, one of the non-covert profiles 727 are selected to control the one or more externally-perceivable output devices 720

In general, each of the profiles 726, 727 comprise a mapping between configuration data, defining respective behavior of the one or more externally-perceivable output devices 720, and configuration protocol data for controlling respective one or more externally-perceivable output devices at one or more second computing devices 601.

In some examples, one of the covert profiles 726 may be a default covert profile, while the other of the covert profiles 726 may be a non-default covert profile. In general, when the computing device 601 enters a covert mode, for example due to a covert mode trigger, as described above, one of the covert profiles 726 is selected to control the one or more externally-perceivable output devices 720. Which of the covert profiles 726 is selected may depend on the detected covert mode trigger; for example, a covert mode trigger detected based on motion sensor data may cause the covert profile 726-1 to be selected, whereas a covert mode trigger detected based on light sensor data may cause the covert profile 726-2 to be selected. Similarly, which of the covert profiles 726 is selected may depend on an original talkgroup selection and/or a new talkgroup selection.

Similarly, a non-covert mode trigger detected based on motion sensor data may cause the non-covert profile 727-1 to be selected, whereas a non-covert mode trigger detected based on light sensor data may cause the non-covert profile 727-2 to be selected. Similarly, which of the non-covert profiles 727 is selected may be depend on an original talkgroup selection and/or a new talkgroup selection. Indeed, when the computing device 601 enters a non-covert mode, for example due to a non-covert mode trigger, one of the non-covert profiles 727 may selected to control the one or more externally-perceivable output devices 720, similar to as described above with respect to covert mode triggers.

Furthermore, while two covert profiles 726 and two non-covert profiles 727 are depicted, the memory 716 may store as few as one covert profile 726 and/or one non-covert profile 727, or more than two covert profiles 726 and/or more than two non-covert profiles 727.

Figure 8:
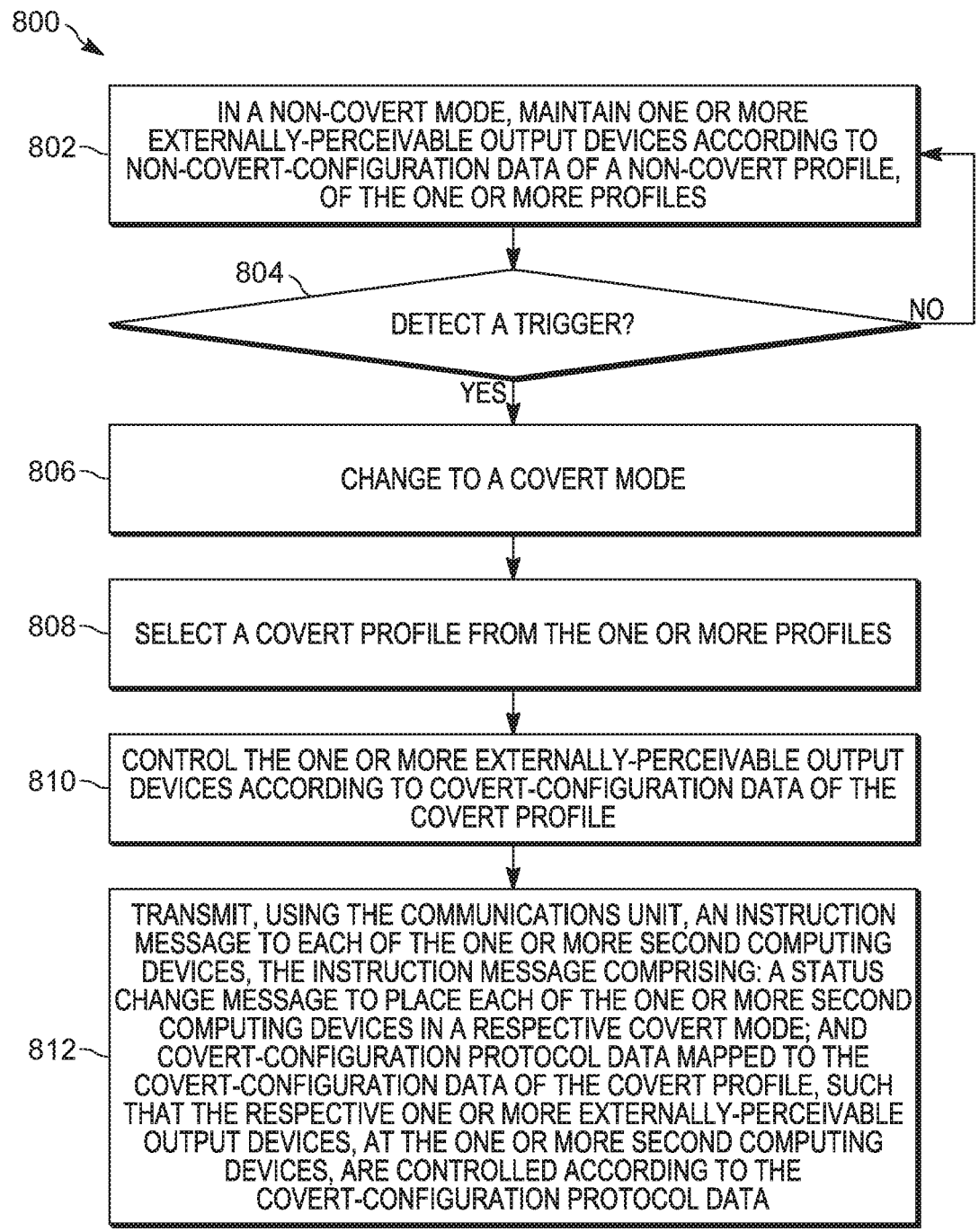
FIG. 8 is a flowchart of a method for triggering and propagating of a covert mode status change using configuration protocol data in accordance with some examples.

Indeed, turning to the memory 716, the memory 716 generally stores instructions corresponding to the code component 725 that, when executed by the controller 713, enables the controller 713 to implement functionality for triggering and propagating of a covert mode status change using configuration protocol data including, but not limited to, the blocks of the method set forth in FIG. 8. In illustrated examples, when the controller 713 executes the code component 725, the controller 713 is enabled to: in a non-covert mode, maintain the one or more externally-perceivable output devices 720 according to non-covert-configuration data of a non-covert profile 727, of the one or more profiles 726, 727 (and specifically one of the non-covert profiles 727-1, 727-2); in response to detecting a trigger: change to a covert mode; select a covert profile 726 from the one or more profiles 726, 727 (and specifically one of the non-covert profiles 727-1, 727-2); control the one or more externally-perceivable output devices 720 according to covert-configuration data of the covert profile 726 (e.g. the selected covert profile 726); and transmit, using the communications unit 702, an instruction message to each of one or more second computing devices 601, the instruction message comprising: a status change message to place each of the one or more second computing devices 601 in a respective covert mode; and covert-configuration protocol data mapped to the covert-configuration data of the covert profile 726 (e.g. the selected covert profile 726), such that the respective one or more externally-perceivable output devices, at the one or more second computing devices 601, are controlled according to the covert-configuration protocol data.

Figure 9:
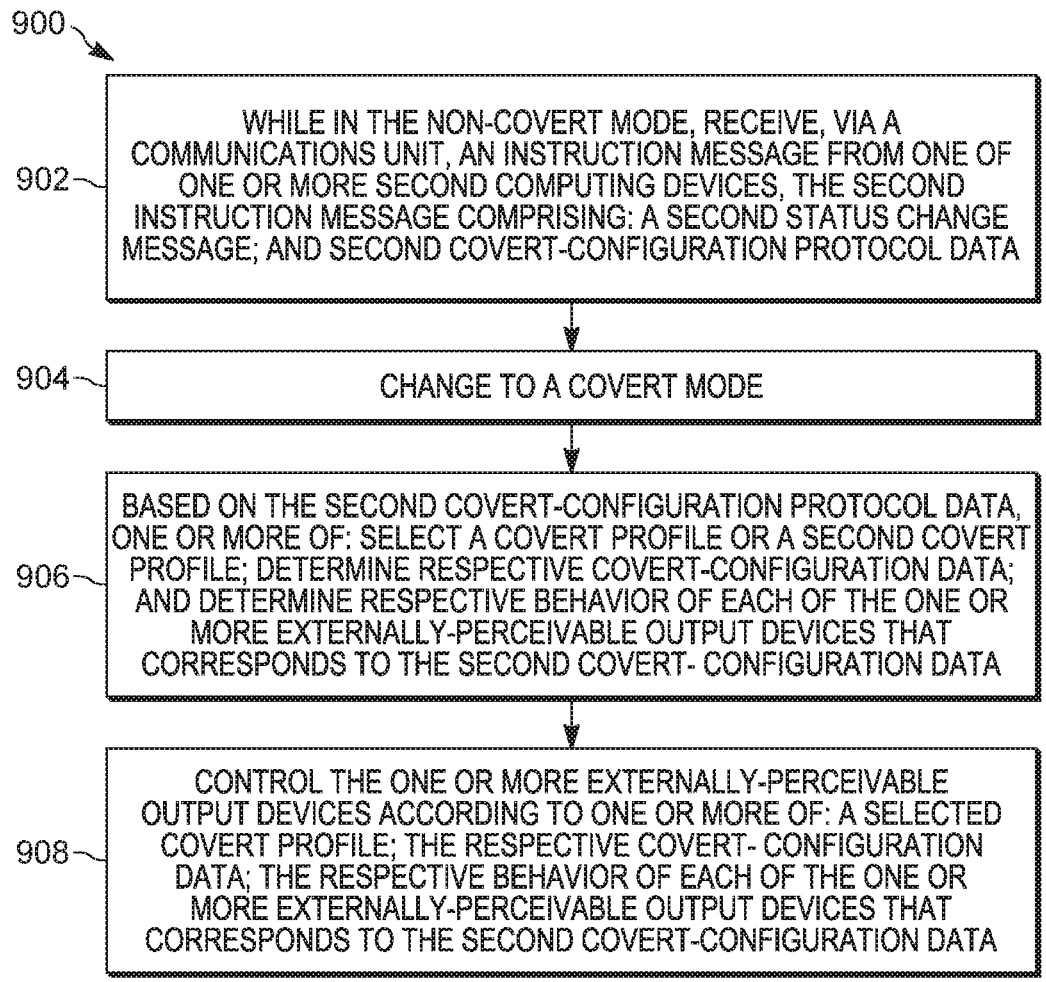
FIG. 9 depicts the system of FIG. 6 implementing a method for triggering and propagating of a covert mode status change using configuration protocol data, in accordance with some examples.

In some examples, the code component 725 may include a further code component that, when executed by the controller 713, enables the controller 713 to implement functionality for propagating a covert mode status change by receiving configuration protocol data including, but not limited to, the blocks of the method set forth in FIG. 9. Alternatively, the memory 716 may store another code component to implement functionality for propagating a covert mode status change by receiving configuration protocol data. Regardless, in illustrated examples, when the controller 713 executes the code component 725 (and/or another code component), the controller 713 is enabled to: while in a non-covert mode, receive, via the communications unit 702, a second instruction message from one of the one or more second computing devices 601, the second instruction message comprising: a second status change message; and second covert-configuration protocol data; and, in response: change to the covert mode; based on the second covert-configuration protocol data, one or more of:

select the covert profile or a second covert profile; determine respective covert-configuration data; and determine respective behavior of each of the one or more externally-perceivable output devices 720 that corresponds to the respective covert-configuration data; and control the one or more externally-perceivable output devices 720 according to one or more of: a selected covert profile 726; the respective covert-configuration data; the respective behavior of each of the one or more externally-perceivable output devices 720 that corresponds to the respective covert-configuration data.

In other words, the computing device 601 may cause the other computing device 601 to enter a covert mode by transmitting an instruction message that includes covert-configuration protocol data and/or the computing device 601 may be placed into a covert mode by receiving, from one of the other computing device 601 an instruction message that includes covert-configuration protocol data.

In some examples, a peripheral device of a computing device 601 may have a similar structure to the example computing device 601 depicted in FIG. 7, but adapted for the functionality of the peripheral device. For example, the RSM 611 of the computing device 601-3 may include a controller and a memory that stores covert profiles and non-covert profiles; however, in these examples, the controller of the RSM 611 (and/or another peripheral device) may not transmit an instruction message that includes configuration protocol data; rather, when a trigger is detected at the RSM (and/or another peripheral device), the RSM 611 (and/or another peripheral device) transmits a covert mode trigger to a "primary" computing device 601 which is controlling the behavior of the RSM 611 (and/or another peripheral device). Hence, in the system 600 some devices (such as the computing devices 601) may be designated as primary devices which control behavior of peripheral devices. Such examples are described in further detail below.

Attention is now directed to FIG. 8, which depicts a flowchart representative of a method 800 for triggering and propagating of a covert mode status change using configuration protocol data. The operations of the method 800 of FIG. 8 correspond to machine readable instructions that are executed by a computing device 601, and specifically the controller 713 of the computing device 601 as depicted in FIG. 7. In the illustrated example, the instructions represented by the blocks of FIG. 8 are stored at the memory 716 for example, as the code component 725. The method 800 of FIG. 8 is one way in which the controller 713 and/or the computing device 601 and/or the system 600 may be configured. Furthermore, the following discussion of the method 800 of FIG. 8 will lead to a further understanding of the system 600, and its various components. However, it is to be understood that the method 800 and/or the system 600 may be varied, and need not work exactly as discussed herein in conjunction with each other, and that such variations are within the scope of present examples.

The method 800 of FIG. 8 need not be performed in the exact sequence as shown and likewise various blocks may be performed in parallel rather than in sequence. Accordingly, the elements of method 800 are referred to herein as "blocks" rather than "steps." The method 800 of FIG. 8 may be implemented on variations of the system 600 of FIG. 1, as well.

At a block 802, the controller 713, in a non-covert mode, maintains the one or more externally-perceivable output devices 720 according to non-covert-configuration data of a non-covert profile 727, of the one or more profiles 726, 727. For example, the computing device 601 may initially be in a non-covert mode, which may be a default mode and/or which may have occurred due to a non-covert mode trigger and/or which may have occurred when an operator of the computing device 601 operated the computing device 601 to enter a non-covert mode (e.g. via an input device).

At a block 804, the controller 713, determines whether a trigger has been detected. A detected trigger may comprise a covert mode trigger, and may be detected by one or more of: receiving the trigger from a peripheral device; receiving the trigger from an input device; receiving the trigger from at least one of the one or more second computing devices 601; and detect the trigger automatically.

For example, input devices of the computing device 601 and/or a peripheral device thereof, may include a covert-mode button, and the like, and the controller 713 may detect a trigger by receiving the trigger when a covert-mode button is actuated at an input device of a peripheral device and/or the computing device 601.

Indeed, in some examples, a covert-mode button, and the like, at a peripheral device (and/or an externally-perceivable output device that is also a peripheral device) of a computing device 601 may be activated which causes the peripheral device to transmit a status change message to its respective computing device 601, which is detected at the computing device 601 receiving the status change message as a covert mode trigger. For example, with brief reference to FIG. 6, the RSM 611 may include a covert-mode button, and the like, which, when activated (e.g. by an operator of the computing device 601-3) causes the RSM 611 to transmit a status change message to the computing device 601-3, which is detected at the computing device 601-3 as a covert mode trigger. Hence, when the computing device 601-3 is implementing the method 300, the block 804 may include receiving a trigger from a peripheral device, and the like. Indeed, in some examples, a peripheral device, such as the RSM 611, may be configured to implement a portion of the method 300, such as the block 802 and the block 804; however, when the peripheral device is not a "primary" device (e.g. the RSM 611 is being controlled by the computing device 601-3) the method 300 ends at the block 804 in response to the peripheral device detecting a trigger and transmitting a covert mode trigger to the primary device. In such examples, the peripheral device does not transmit covert-configuration protocol data as described in further detail below.

In yet further examples, the controller 713 may implement the block 804 by receiving a trigger from an input device, for example by an operator of the computing device 601 implementing the method 800 operating the computing device 601 to select a covert profile 762. Hence, in some examples, a trigger may be detected at the block 804 by the controller 713 detecting a selection of a covert profile 726.

However, a different computing device 601 may transmit a covert mode trigger (e.g. in the form of an instruction message) to all the other computing devices 601, and the controller 713 may detect the trigger at the block 804 by receiving the trigger from another computing device 601 (e.g. via the communications unit 702).

Furthermore, a trigger may be automatically detected as described above with reference to the step 504 of the method 500. Furthermore, any covert mode trigger described above, for example with reference to the step 504 of the method 500, is within the scope of the method 800.

In some examples, more than one trigger may be detected. For example, the controller 713 may detect or receive a plurality of triggers from one or more of a peripheral device, an input device, one or more second computing devices 601, and automatically. In some of these examples, the plurality of triggers may each have and/or be associated with, a respective priority. For example, each of the computing devices 601 of the system 600 may be associated with a respective priority; when all of the computing devices 601 transmit triggers (e.g. in the form of instructions messages, and the like; see the block 812 described below) to all the other computing devices 601, a trigger that originated at a computing device 601 having the highest priority, also has the highest priority over the other triggers. In particular, the controller 713 may be further configured to detect a trigger, based a given trigger that has a highest priority of a plurality of triggers. And, as will be described hereafter, given covert-configuration protocol data associated with the given trigger having the highest priority is used to control the one or more externally-perceivable output devices 720

When a trigger is not detected (e.g. a "NO" decision at the block 804), the controller 713 continues to maintain, at the block 802, the one or more externally-perceivable output devices 720 according to non-covert-configuration data of a non-covert profile 727.

However, when a trigger is detected (e.g. a "YES" decision at the block 804), at a block 806, the controller 713, in response to detecting the trigger: changes to a covert mode and, at a block 808, selects a covert profile 726 from the one or more profiles 726, 727. In some examples, the selected covert profile 726 may depend on a type and/or a priority of the trigger detected at the block 804. For example, selected covert profile 726 may be a default cover profile, however, the selected covert profile 726 may be to specifically suppress one or more of audio emission and/or light emission and/or electromagnetic radiation emission and/or notifications at the one or more externally-perceivable output devices 720. In yet further examples, the block 806 and the block 808 may include changing to a covert mode based on a covert profile 726 selected by the operator of a computing device 601 implementing the method 800; in these examples, the blocks 804, 806 and 808 may be combined as detection of a selection of a covert profile 726 via an input device (e.g. at the block 808) may be a trigger of the block 804, and which also causes the controller 713 to change to a covert mode at the block 806.

At a block 810, the controller 713, controls the one or more externally-perceivable output devices 720 according to covert-configuration data of the covert profile 726 (e.g. the covert profile 726 selected at the block 808).

For example, the controller 713 may be further configured to control the one or more externally-perceivable output devices 720 according to the covert-configuration data (e.g. of the selected covert profile 726) to one or more of: suppress externally-perceivable outputs at the one or more externally-perceivable output devices 720; and route the externally-perceivable outputs at the one or more externally-perceivable output devices 720 to one or more other devices configured to operate according to non-externally-perceivable outputs.

For example, when the one or more externally-perceivable output devices 720 comprises one or more light emitting devices, and the controller 713 is further configured to control the one or more externally-perceivable output devices 720 according to the covert-configuration data by one or more of: dimming at least one of the one or more light emitting devices (e.g. the display screens 605 and/or the light 609) to a respective brightness level; and turning off at least one of the one or more light emitting devices. Such turning off at least one of the one or more light emitting devices may include, but is not limited to, turning off a flash of a camera and/or a flash mode and/or automatic flash mode of a light.

In another example, when the one or more externally-perceivable output devices 720 comprises one or more speakers (e.g. the speakers 607 and/or the RSM 611), and the controller 713 is further configured to control the one or more externally-perceivable output devices 720 according to the covert-configuration data by one or more of: routing audio from at least one of the one or more speakers to one or more of a headset and an earpiece (e.g. the headset 613 and the earpiece 615), each in communication with the controller 713; reducing audio from at least one of the one or more speakers to below a given audio level; and turning off at least one of the one or more speakers.

In a further example, when the one or more externally-perceivable output devices 720 comprises one or more notification devices (e.g. a haptic device that is not body worn and/or the speakers 607 and/or the RSM 611 and/or the display screens 605), and the controller 713 is further configured to control the one or more externally-perceivable output devices 720 according to the covert-configuration data by: routing notifications from one or more notification devices to one or more haptic devices in communication with the controller 713. Such examples may include, but are not limited to, turning off tone notifications using the speakers 607 and/or the RSM 611 and/or turning off vibration notifications at a haptic device that is not body-worn.

In yet a further example, when the one or more externally-perceivable output devices 720 comprises one or more electromagnetic radiation emitting devices, and the controller 713 is further configured to control the one or more externally-perceivable output devices 720 according to the covert-configuration data by: reducing electromagnetic emissions from the one or more electromagnetic radiation emitting devices to a respective level.

At a block 812, the controller 713 transmits, using the communications unit 702, an instruction message to each of one or more second computing devices 601, the instruction message comprising: a status change message to place each of the one or more second computing devices 601 in a respective covert mode; and covert-configuration protocol data mapped to the covert-configuration data of the covert profile 726 (e.g. the selected covert profile 726), such that the respective one or more externally-perceivable output devices, at the one or more second computing devices 601, are controlled according to the covert-configuration protocol data.

In some examples, when a second computing device 601 receives the instruction message, the second computing device 601 generally controls respective one or more externally-perceivable output devices according to the received covert-configuration protocol data, for example, on a device by device basis, and without reference to a covert profile. In other examples, when a second computing device 601 receives the instruction message, the second computing device 601 generally controls respective one or more externally-perceivable output devices by matching the received covert-configuration protocol data to existing covert profiles to select a covert profile that most closely corresponds to, and/or matches, the received covert-configuration protocol data.

Furthermore, when a covert mode status change is received from a peripheral device as the detected trigger at the block 804 (e.g. as described above with respect to the RSM 611), in some examples, the peripheral device may also, in some examples, receive the instruction message transmitted at the block 812 to control the peripheral device according to the covert-configuration protocol data; hence, in these examples, such peripheral devices may also store covert profiles such that when such a peripheral device receives the instruction message, the peripheral device generally controls respective one or more externally-perceivable output devices (e.g. a speaker at the RSM 611) by matching the received covert-configuration protocol data to existing covert profiles to select a covert profile that most closely corresponds to, and/or matches, the received covert-configuration protocol data.

The covert-configuration protocol data and the covert-configuration data is described in more detail below.

However, prior to discussing the covert-configuration protocol data and the covert-configuration data, alternatives of the method 800 are described in which a computing device 601 is in a covert mode and detects a non-covert mode trigger.

For example, the controller 713 may be further configured to, in response to detecting a second trigger (e.g. a non-covert mode trigger, which may alternatively be detected at a block similar to the block 804): change to a non-covert mode and/or change back to a non-convert mode (e.g. at a block similar to the block 806); select (e.g. at a block similar to the block 808) a non-covert profile 727-1, or a second non-convert profile 727-2, (i.e. one of the non-covert profiles 727) from the one or more profiles 726, 727; control (e.g. at a block similar to the block 810) the one or more externally-perceivable output devices 720 according to respective non-covert-configuration data of a selected non-covert profile 727; and transmit (e.g. at a block similar to the block 812), using the communications unit 702, a second instruction message (e.g. similar to the instruction message of the block 812) to each of the one or more second computing devices 601, the second instruction message comprising: a non-status change message to place each of the one or more second computing devices 601 in a respective non-covert mode; and non-covert-configuration protocol data mapped to the respective non-covert-configuration data of the selected non-covert profile 727, such that the respective one or more externally-perceivable output devices, at the one or more second computing devices 601, are controlled according to one or more of: the non-covert-configuration protocol data (e.g. transmitted with the second instruction message; and a respective non-covert profile, as selected by each of the one or more second computing devices 601.

As with the covert-configuration protocol data, in some examples, when a second computing device 601 (and/or a peripheral device) receives the second instruction message, the second computing device 601 generally controls respective one or more externally-perceivable output devices according to the received non-covert-configuration protocol data, for example, on a device by device basis, and without reference to a non-covert profile. In other examples, when a second computing device 601 receives the second instruction message, the second computing device 601 generally controls respective one or more externally-perceivable output devices by matching the received non-covert-configuration protocol data to existing non-covert profiles to select a non-covert profile that most closely corresponds to the received non-covert-configuration protocol data. In yet further examples, when a second computing device 601 receives the second instruction message, the second computing device 601 may ignore the received non-covert-configuration protocol data and select any suitable non-covert profile to control the respective one or more externally-perceivable output devices.

In other words, instruction messages that include configuration protocol data, mapped to the respective configuration data, may be transmitted between the computing devices 601 to place all the computing devices 601 into a similar covert mode or similar non-covert mode, and further control respective one or more externally-perceivable output devices of the computing devices 601 in a similar manner but with behavior of the computing devices 601 controlled according to local configuration data.

For example, attention is now directed to FIG. 9, which depicts a flowchart representative of a method 900 for changing to a covert mode status change by receiving configuration protocol data. The operations of the method 900 of FIG. 9 correspond to machine readable instructions that are executed by a computing device 601, and specifically the controller 713 of the computing device 601 as depicted in FIG. 7. In the illustrated example, the instructions represented by the blocks of FIG. 9 are stored at the memory 716 for example, as the code component 725, a component of the code component 725 that is different from a component used to implement the method 800 and/or a different code component. The method 900 of FIG. 9 is one way in which the controller 713 and/or the computing device 601 and/or the system 600 may be configured. Furthermore, the following discussion of the method 900 of FIG. 9 will lead to a further understanding of the system 600, and its various components. However, it is to be understood that the method 900 and/or the system 600 may be varied, and need not work exactly as discussed herein in conjunction with each other, and that such variations are within the scope of present examples.

The method 900 of FIG. 9 need not be performed in the exact sequence as shown and likewise various blocks may be performed in parallel rather than in sequence. Accordingly, the elements of method 900 are referred to herein as "blocks" rather than "steps." The method 900 of FIG. 9 may be implemented on variations of the system 600 of FIG. 1, as well. For example, as described above, a peripheral device, such as the RSM 611, may implement the method 900.

At a block 902, the controller 713, while in a non-covert mode, receives, via the communications unit 702, a second instruction message (e.g. which may be similar to and/or the same as the instruction message transmitted at the block 812 of the method 800) from one of the one or more second computing devices 601, the second instruction message comprising: a second status change message; and second covert-configuration protocol data.

At a block 904, the controller 713, in response to receiving the second instruction message at the block 902: changes to a covert mode.

At a block 906, the controller 713, based on the second covert-configuration protocol data, one or more of: selects a covert profile 726 or a second covert profile 726 (e.g. one of the covert profiles 726 is selected or, when there is only one covert profile 726, the one covert profile 726 is selected); determines respective covert-configuration data; and determines respective behavior of each of the one or more externally-perceivable output devices 720 that corresponds to the respective covert-configuration data.

At a block 908, the controller 713, controls the one or more externally-perceivable output devices 720 according to one or more of: a selected covert profile 726; the respective covert-configuration data; the respective behavior of each of the one or more externally-perceivable output devices 720 that corresponds to the respective covert-configuration data.

Attention is next directed to FIG. 10 which depicts an example of configuration protocol data 1001 that may be included in covert profiles 726, and three examples of configuration data 1002-1, 1002-2, 1002-3 that may also be included in covert profiles 726 mapped to the configuration protocol data 1001. The configuration data 1002-1, 1002-2, 1002-3 is interchangeably referred to, hereafter, collectively, as the configuration data 1002 and, generically, as a set of configuration data 1002 and/or the configuration data 1002.

In general, the configuration protocol data 1001 includes commands and/or instructions, and the like, which may be "understood" by all the computing devices 601, for example, when implementing the methods 800, 900. The configuration protocol data 1001 comprises generic commands and/or instructions that indicate how a computing device 601 is to control respective externally-perceivable output devices 720, for example when entering a covert mode. For example, as depicted, the configuration protocol data 1001 includes commands for "LIGHTS OFF", "SOUND REROUTE", "RADIO OFF" and "NOTIFICATIONS OFF" (e.g. one command per row). However, such commands do not specifically instruct how the respective externally-perceivable output devices 720 at the computing devices 601 are to be controlled in response to such commands.

However, the configuration data 1002, as mapped to the configuration protocol data 1001, provide specific commands and/or instructions as to how a computing device 601 is to control respective externally-perceivable output devices 720 in response to receiving the generic commands of the configuration protocol data 1001.

Conversely, when a covert profile 726 is selected (e.g. at the block 808 of the method 800) at a computing device 601 that includes the configuration data 1002, the configuration protocol data 1001 (e.g. at the block 808 of the method 800) is transmitted to the other computing devices 601 which, when received (e.g. at the block 902 of the method 900), selects a covert profile 726 that best corresponds to the configuration protocol data 1001 and controls respective externally-perceivable output devices 720 accordingly.

Alternatively, in some examples, each row (e.g. each command, and the like) of the configuration protocol data 1001 may be mapped to a set of configuration data 1002 that corresponds to the commands in the row, independent of profiles, so that the commands in the configuration protocol data 1001 may be implemented without selecting a profile 726. For example, the command "LIGHTS OFF" may be mapped to a specific set of commands of configuration data 1002 for turning off lights and the like at a computing device 601, without such a mapping being stored in a profile 726.

FIG. 10 further shows specific examples of the configuration data 1002.

As depicted, the configuration data 1002-1 is specific to the computing device 601-1. The commands "Dim Display Screen 605-1 To 30%" and "Turn Off Light 609 and Flash Mode" are mapped to the command "LIGHTS OFF" of the configuration protocol data 1001. Similarly, the command "Reduce Audio of Speaker 607-1 to 25%" is mapped to the command "SOUND REROUTE" of the configuration protocol data 1001. Similarly, the command "Reduce Radio Emissions to 25%" is mapped to the command "RADIO OFF" of the configuration protocol data 1001. Similar, the command "Visual Notifications At Display Screen 605-1 Only" is mapped to the command "NOTIFICATIONS OFF" of the configuration protocol data 1001. Hence, for example, when the configuration data 1002-1 comprises configuration data of a selected covert profile 726 at the computing device 601, the commands of the configuration protocol data 1001 are transmitted to the other computing devices 601 to instruct the other computing devices 601 on how to control their respective one or more externally-perceivable output devices in a covert mode.

Similarly, the configuration data 1002-2 is specific to the computing device 601-2. The command "Dim Display Screen 605-1 To 25%" is mapped to the command "LIGHTS OFF" of the configuration protocol data 1001. Similarly, the command "Route Audio From Speaker 607-2 To Headset 913" is mapped to the command "SOUND REROUTE" of the configuration protocol data 1001. Similarly, the command "Reduce Radio Emissions to 30%" is mapped to the command "RADIO OFF" of the configuration protocol data 1001. Similar, the command "Audio Notifications At Headset 913 Only" is mapped to the command "NOTIFICATIONS OFF" of the configuration protocol data 1001. Hence, for example, when the configuration protocol data 1001 is received at the computing device 601-2, the corresponding commands of the configuration data 1002-1 are implemented at the computing device 601-2 (e.g. at the block 908 of the method 900).

Similarly, the configuration data 1002-3 is specific to the computing device 601-3. The command "Route Audio From Speaker 607-2 and RSM 611 To Earpiece 615" is mapped to the command "SOUND REROUTE" of the configuration protocol data 1001. Similarly, the command "Reduce Radio Emissions to 20%" is mapped to the command "RADIO OFF" of the configuration protocol data 1001. Similar, the command "Route Notifications To Haptic Device 617" is mapped to the command "NOTIFICATIONS OFF" of the configuration protocol data 1001.

However, no command of the configuration data 1002-3 is mapped to the command "LIGHTS OFF" of the configuration protocol data 1001 as the computing device 601-3 includes no lights or display screens, and the like.

Hence, for example, when the configuration protocol data 1001 is received at the computing device 601-3, the corresponding commands of the configuration data 1002-1 are implemented at the computing device 601-3 (e.g. at the block 908 of the method 900). While the command "LIGHTS OFF" of the configuration protocol data 1001 may be received, the command is not implemented as the computing device 601-3 includes no lights or display screens, and the like. However, conversely, when the computing device 601-3 is implementing the method 800, the configuration protocol data 1001 may include the command "LIGHTS OFF" to ensure that the computing devices 601-1, 601-2 turn off and/or dim their respective light emitting devices.

While not depicted, in FIG. 10, the configuration protocol data 1001 and the configuration data 1002 may also be adapted for non-convert profiles 727.

Furthermore, while the depicted commands of the configuration protocol data 1001 are binary (e.g. off/on or route/not-reroute), in other examples, the commands may not be binary. For example, the "LIGHTS OFF" command may be replaced by a command to "LIGHTS 25%", and the like, for example to dim lights 25% (e.g. of a maximum brightness). However, such a "LIGHTS 25%" command may be mapped to configuration data 1002 where respective light emitting devices dim to values other than 25%. In other words, specific action of externally-perceivable output devices is controlled specifically by the configuration data 1002 rather than by the more generic configuration protocol data (e.g. which is used to implement a protocol for controlling behavior of externally-perceivable output devices across a plurality of computing devices 601, rather than specifically including instructions for controlling the externally-perceivable output devices).

As depicted in FIG. 10, only one set of configuration protocol data 1001 and configuration data 1002 is depicted for each of the computing devices 601. For example, while the mapped configuration protocol data 1001 and configuration data 1002 may be for one covert profile 726, different sets of configuration protocol data 1001 and configuration data 1002 may be included in each of a plurality of covert profiles 726. Furthermore, when an instruction message (e.g. including configuration protocol data 1001) is received, at a computing device 601, the computing device 601 may select a covert profile 726 that best matches and/or corresponds to the received configuration protocol data 1001.

Figure 11:
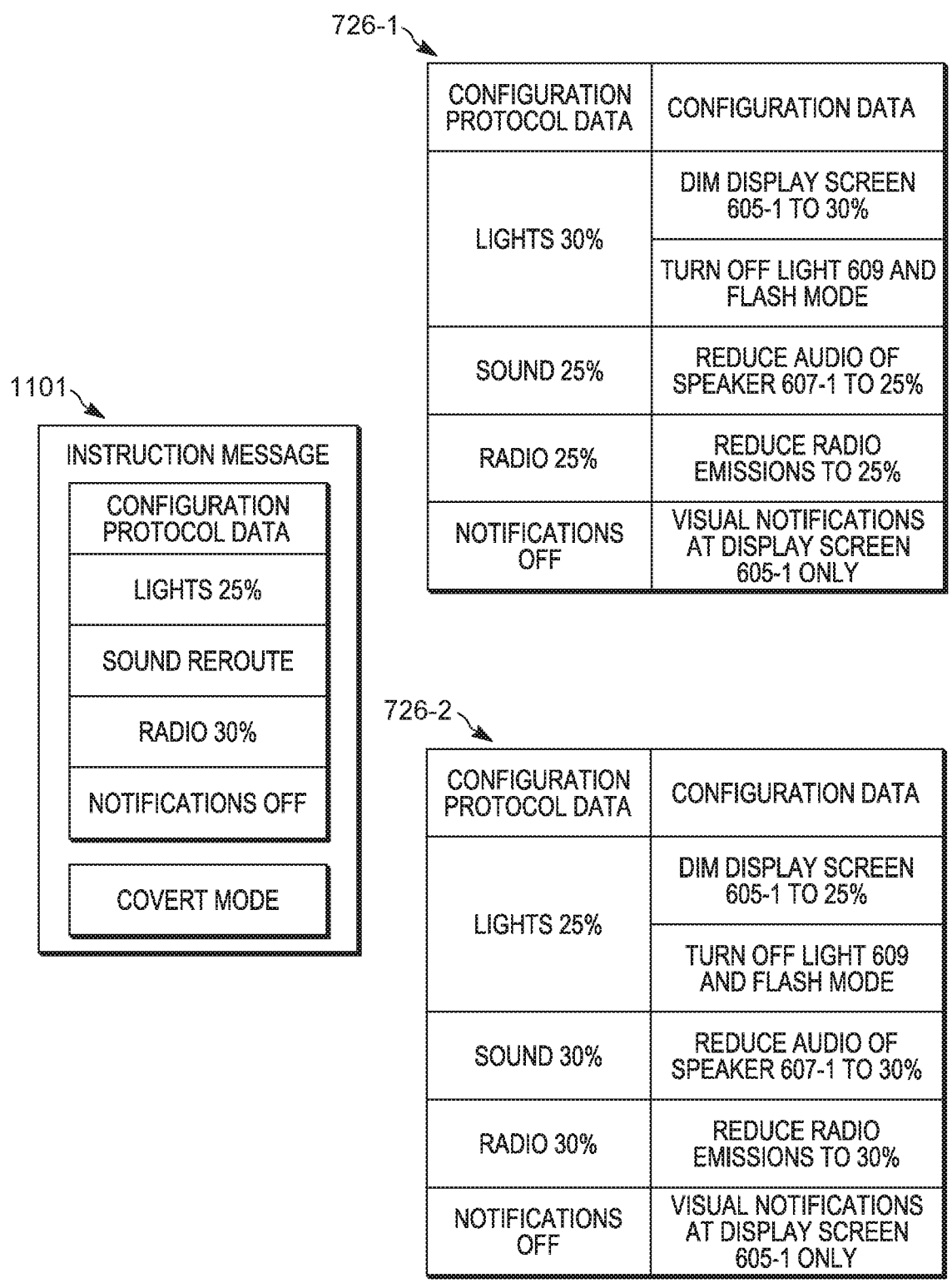
FIG. 11 depicts an example instruction message compared to a plurality of covert profiles for selection thereof, in accordance with some examples.

For example, attention is next directed to FIG. 11 which depicts an instruction message 1101 that may be received at the computing device 601-1, for example when implementing the method 900 (e.g. one of the other computing devices 601-2, 601-3 is implementing the method 800 and transmits the instruction message 1101 to the computing device 601-1 at the block 812).

The instruction message 1101 includes configuration protocol data, similar to the configuration protocol data 1001, but which includes binary and non-binary commands: "LIGHTS 25%" (e.g. for dimming), "SOUND REROUTE", "RADIO 30%" (e.g. to reduce radio electromagnetic emissions, and the like, to 30% of maximum), and "NOTIFICATIONS OFF". The instruction message 1101 further includes a command "COVERT MODE" to place the computing device 601-1 into a covert mode.

As depicted, FIG. 11 also depicts examples of the covert profiles 726-1, 726-2 each of which include configuration protocol data (including binary and non-binary commands) and configuration data, similar to the configuration protocol data 1001 and the configuration data 1002. However, the configuration protocol data of the instruction message 1101 does not exactly match either set of configuration protocol data of each of the depicted covert profiles 726. Hence, the controller 713 of the computing device 601-1, in implementing the block 906 of the method 900, compares the configuration protocol data of the instruction message 1101 with the configuration protocol data of each of the depicted covert profiles 726 to determine a best match and/or best correspondence. For example, the covert profiles 726-1 may be selected as, while none of the commands of the configuration protocol data for controlling "LIGHTS" or "RADIO" exactly match, according to the command "SOUND REROUTE" of the configuration protocol data of the instruction message 1101, the sound is to be rerouted; however as the computing device 601-1 is not able to reroute sound, the covert profile 726-1 is selected over the covert profile 726-2 as selection of the covert profile 726-1 results in the lowest reduction of sound at the speaker 607-1 (e.g. 25% for the covert profile 726-1 as compared to 30% for the covert profile 726-2). However, any suitable criteria for selecting a best match is within the scope of the present specification, including, but not limited to, weighted matching schemes.

While the present examples have been described with respect to all the computing devices 601 of the system 600 aligning behavior of their externally-perceivable output devices, in some examples, the system 600 may include computing devices that are "stand-alone" computing devices, at least with respect to selecting covert modes and/or covert profiles and/or selecting non-covert modes and/or non-covert profiles. For example, such a stand-alone" computing device may not be implementing the method 800 or the method 900 and/or the such a stand-alone" computing device may ignore received instruction messages and/or such a stand-alone" computing device may not be in communication with the computing devices 601.

In accordance with the foregoing, a method, device, and system for triggering and propagating of a covert mode status change using configuration protocol data is provided. As a result of the foregoing, a covert state of a large number of officers, vehicles, and other users and devices can be synchronized, and as can their externally-perceivable output devices. For example, a commander or other person on scene and in possession of sufficient information to believe that a covert state should be changed can cause all nearby vehicles, officers, and other users and devices to change their state as well simply by changing their own covert state, and furthermore, the behavior of their externally-perceivable output devices are generally aligned, greatly simplifying the process and increasing a safety and security of first responders.

Other advantages and benefits are possible as well. In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A computing device comprising:
   a communications unit configured to communicate with one or more second computing devices remote from the computing device;
   one or more externally-perceivable output devices local to the computing device;
   a memory storing one or more profiles, each of the one or more profiles classified as covert or non-covert, each of the one or more profiles comprising a mapping between configuration data, defining respective behavior of the one or more externally-perceivable output devices, and configuration protocol data for controlling respective one or more externally-perceivable output devices at the one or more second computing devices; and
   a controller communicatively coupled to the communications unit, the one or more externally-perceivable output devices, and the memory, the controller configured to:
      in a non-covert mode, maintain the one or more externally-perceivable output devices according to non-covert-configuration data of a non-covert profile, of the one or more profiles;
      in response to detecting a trigger:
         change to a covert mode in a local covert mode state change;
         select a covert profile from the one or more profiles;
         control the one or more externally-perceivable output devices according to covert-configuration data of the covert profile in the local covert mode state change; and
         transmit, using the communications unit, an instruction message to each of the one or more second computing devices, the instruction message comprising:
            a status change message to place each of the one or more second computing devices, remote from the computing device, in a respective covert mode; and
            covert-configuration protocol data mapped to the covert-configuration data of the covert profile, such that the respective one or more externally-perceivable output devices, at the one or more second computing devices, are controlled according to the covert-configuration protocol data in a covert mode state change local to the one or more second computing devices, but remote from the computing device, such that the covert mode status change is propagated from the computing device to the one or more second computing devices.

2. The computing device of claim 1, wherein the controller is further configured to control the one or more externally-perceivable output devices according to the covert-configuration data to one or more of:
   suppress externally-perceivable outputs at the one or more externally-perceivable output devices; and
   route the externally-perceivable outputs at the one or more externally-perceivable output devices to one or more other devices configured to operate according to non-externally-perceivable outputs.

3. The computing device of claim 1, wherein the controller is further configured to, in response to detecting a second trigger:
   change back to the non-covert mode;
   select the non-covert profile, or a second non-convert profile, from the one or more profiles;
   control the one or more externally-perceivable output devices according to respective non-covert-configuration data of a selected non-covert profile; and
   transmit, using the communications unit, a second instruction message to each of the one or more second computing devices, the second instruction message comprising:

a non-status change message to place each of the one or more second computing devices in a respective non-covert mode; and non-covert-configuration protocol data mapped to the respective non-covert-configuration data of the selected non-covert profile, such that the respective one or more externally-perceivable output devices, at the one or more second computing devices, are controlled according to one or more of: the non-covert-configuration protocol data; and a respective non-covert profile, as selected by each of the one or more second computing devices.

4. The computing device of claim 1, wherein the controller is further configured to:

while in the non-covert mode, receive, via the communications unit, a second instruction message from one of the one or more second computing devices, the second instruction message comprising: a second status change message; and second covert-configuration protocol data; and, in response:

change to the covert mode;

based on the second covert-configuration protocol data, one or more of: select the covert profile or a second covert profile; determine respective covert-configuration data; and determine respective behavior of each of the one or more externally-perceivable output devices that corresponds to the respective covert-configuration data; and control the one or more externally-perceivable output devices according to one or more of: a selected covert profile; the respective covert-configuration data; the respective behavior of each of the one or more externally-perceivable output devices that corresponds to the respective covert-configuration data.

5. The computing device of claim 1, wherein the one or more externally-perceivable output devices comprises one or more light emitting devices, and the controller is further configured to control the one or more externally-perceivable output devices according to the covert-configuration data by one or more of: dimming at least one of the one or more light emitting devices to a respective brightness level; and turning off at least one of the one or more light emitting devices.

6. The computing device of claim 1, wherein the one or more externally-perceivable output devices comprises one or more speakers, and the controller is further configured to control the one or more externally-perceivable output devices according to the covert-configuration data by one or more of: routing audio from at least one of the one or more speakers to one or more of a headset and an earpiece, each in communication with the controller; reducing audio from at least one of the one or more speakers to below a given audio level; and turning off at least one of the one or more speakers.

7. The computing device of claim 1, wherein the one or more externally-perceivable output devices comprises one or more notification devices, and the controller is further configured to control the one or more externally-perceivable output devices according to the covert-configuration data by: routing notifications from one or more notification devices to one or more haptic devices in communication with the controller.

8. The computing device of claim 1, wherein the one or more externally-perceivable output devices comprises one or more electromagnetic radiation emitting devices, and the controller is further configured to control the one or more externally-perceivable output devices according to the covert-configuration data by: reducing electromagnetic emissions from the one or more electromagnetic radiation emitting devices to a respective level.

9. The computing device of claim 1, wherein the controller is further configured to detect the trigger by one or more of:

receiving the trigger from a peripheral device;

receiving the trigger from an input device;

receiving the trigger from at least one of the one or more second computing devices; and detect the trigger automatically.

10. The computing device of claim 1, wherein the controller is further configured to detect or receive a plurality of triggers from one or more of a peripheral device, an input device, the one or more second computing devices, and automatically, the plurality of triggers each having a respective priority, and wherein the controller is further configured to detect the trigger based a given trigger that has a highest priority of the plurality of triggers, and wherein given covert-configuration protocol data associated with the given trigger is used to control the one or more externally-perceivable output devices.

11. A method comprising:

while a computing device is in a non-covert mode, maintaining, at the computing device, one or more externally-perceivable output devices, local to the computing device, according to non-covert-configuration data of a non-covert profile, of one or more profiles, the computing device having access to a memory storing the one or more profiles, each of the one or more profiles classified as covert or non-covert, each of the one or more profiles comprising a mapping between configuration data, defining respective behavior of the one or more externally-perceivable output devices, and configuration protocol data for controlling respective one or more externally-perceivable output devices at one or more second computing devices remote from the computing device;

in response to detecting, at the computing device, a trigger:

changing the computing device to a covert mode in a local covert mode state change;

selecting, at the computing device, a covert profile from the one or more profiles;

controlling, at the computing device, the one or more externally-perceivable output devices according to covert-configuration data of the covert profile in the local covert mode state change; and transmitting, at the computing device, an instruction message to each of one or more second computing devices, the instruction message comprising:

a status change message to place each of the one or more second computing devices, remote from the computing device, in a respective covert mode; and covert-configuration protocol data mapped to the covert-configuration data of the covert profile, such that the respective one or more externally-perceivable output devices, at the one or more second computing devices, are controlled according to the covert-configuration protocol data in a covert mode state change local to the one or more second computing devices, but remote from the computing device, such that the covert mode status change is propagated from the computing device to the one or more second computing devices.

12. The method of claim 11, further comprising controlling the one or more externally-perceivable output devices according to the covert-configuration data to one or more of:

suppress externally-perceivable outputs at the one or more externally-perceivable output devices; and route the externally-perceivable outputs at the one or more externally-perceivable output devices to one or more other devices configured to operate according to non-externally-perceivable outputs.

13. The method of claim 11, further comprising, in response to the computing device detecting a second trigger:

changing the computing device back to the non-covert mode;

selecting, at the computing device, the non-covert profile, or a second non-convert profile, from the one or more profiles;

controlling, at the computing device, the one or more externally-perceivable output devices according to respective non-covert-configuration data of a selected non-covert profile; and transmitting, at the computing device, a second instruction message to each of the one or more second computing devices, the second instruction message comprising:

a non-status change message to place each of the one or more second computing devices in a respective non-covert mode; and non-covert-configuration protocol data mapped to the respective non-covert-configuration data of the selected non-covert profile, such that the respective one or more externally-perceivable output devices, at the one or more second computing devices, are controlled according to one or more of: the non-covert-configuration protocol data; and a respective non-covert profile, as selected by each of the one or more second computing devices.

14. The method of claim 11, further comprising:

while the computing device is in the non-covert mode, receiving, at the computing device, a second instruction message from one of the one or more second computing devices, the second instruction message comprising: a second status change message; and second covert-configuration protocol data; and, in response:

changing the computing device to the covert mode;

based on the second covert-configuration protocol data, one or more of: selecting, at the computing device, the covert profile or a second covert profile; determine respective covert-configuration data; and determine respective behavior of each of the one or more externally-perceivable output devices that corresponds to the respective covert-configuration data; and controlling, at the computing device, the one or more externally-perceivable output devices according to one or more of: a selected covert profile; the respective covert-configuration data; the respective behavior of each of the one or more externally-perceivable output devices that corresponds to the respective covert-configuration data.

15. The method of claim 11, wherein the one or more externally-perceivable output devices comprises one or more light emitting devices, and the method further comprises controlling, at the computing device, the one or more externally-perceivable output devices according to the covert-configuration data by one or more of: dimming at least one of the one or more light emitting devices to a respective brightness level; and turning off at least one of the one or more light emitting devices.

16. The method of claim 11, wherein the one or more externally-perceivable output devices comprises one or more speakers, and the method further comprises controlling, at the computing device, the one or more externally-perceivable output devices according to the covert-configuration data by one or more of: routing audio from at least one of the one or more speakers to one or more of a headset and an earpiece, each in communication with the controller; reducing audio from at least one of the one or more speakers to below a given audio level; and turning off at least one of the one or more speakers.

17. The method of claim 11, wherein the one or more externally-perceivable output devices comprises one or more notification devices, and the method further comprises controlling, at the computing device, the one or more externally-perceivable output devices according to the covert-configuration data by: routing notifications from one or more notification devices to one or more haptic devices in communication with the controller.

18. The method of claim 11, wherein the one or more externally-perceivable output devices comprises one or more electromagnetic radiation emitting devices, and the method further comprises controlling, at the computing device, the one or more externally-perceivable output devices according to the covert-configuration data by: reducing electromagnetic emissions from the one or more electromagnetic radiation emitting devices to a respective level.

19. The method of claim 11, further comprising detecting the trigger by one or more of:

receiving the trigger from a peripheral device;

receiving the trigger from an input device;

receiving the trigger from at least one of the one or more second computing devices; and detect the trigger automatically.

20. The method of claim 11, further comprising detecting or receiving a plurality of triggers, at the computing device, from one or more of a peripheral device, an input device, the one or more second computing devices, and automatically, the plurality of triggers each having a respective priority, and wherein the method further comprises detecting the trigger based a given trigger that has a highest priority of the plurality of triggers, and wherein given covert-configuration protocol data associated with the given trigger is used to control the one or more externally-perceivable output devices.

* * * * *